US00RE45011E

(19) United States
(12) Reissued Patent
Schetky et al.

(10) Patent Number: US RE45,011 E
(45) Date of Reissued Patent: Jul. 15, 2014

(54) EXPANDABLE TUBING AND METHOD

(75) Inventors: L. McDonald Schetky, Camden, ME (US); Craig D. Johnson, Montgomery, TX (US); Matthew R. Hackworth, Pearland, TX (US); Patrick W. Bixenman, Houston, TX (US); Peter Besselink, Enschede (NL)

(73) Assignee: Halliburton Energy Services, Inc., Houston, TX (US)

(21) Appl. No.: 12/872,178

(22) Filed: Aug. 31, 2010

Related U.S. Patent Documents

Reissue of:

(64) Patent No.: 7,398,831
Issued: Jul. 15, 2008
Appl. No.: 10/315,569
Filed: Dec. 10, 2002

U.S. Applications:

(63) Continuation of application No. 09/973,442, filed on Oct. 9, 2001, now Pat. No. 6,799,637.

(60) Provisional application No. 60/242,276, filed on Oct. 20, 2000, provisional application No. 60/263,941, filed on Jan. 24, 2001.

(51) Int. Cl.
*E21B 23/02* (2006.01)

(52) U.S. Cl.
USPC ..... 166/380; 166/207

(58) Field of Classification Search
USPC ..... 166/380, 382, 207, 227
See application file for complete search history.

(56) References Cited

U.S. PATENT DOCUMENTS

| | | | |
|---|---|---|---|
| 261,252 | A | 7/1882 | Olmsted |
| 380,419 | A | 4/1888 | Bignall |
| 997,191 | A | 7/1911 | Hogarth |
| 1,135,809 | A | 4/1915 | Jones |
| 1,229,437 | A | 6/1917 | Foster |
| 1,233,888 | A | 7/1917 | Leonard |
| 1,276,213 | A | 8/1918 | Hare |
| 1,301,285 | A | 4/1919 | Leonard |
| 1,314,600 | A | 9/1919 | McCakey |
| 1,647,907 | A | 11/1927 | Doty |
| 1,945,079 | A | 1/1934 | Riemenschneider |

(Continued)

FOREIGN PATENT DOCUMENTS

| | | |
|---|---|---|
| AU | 784777 | 8/2002 |
| AU | 2006202182 | 6/2006 |

(Continued)

OTHER PUBLICATIONS

Gravel Pack Systems: Mini-Beta Gravel Pack System, Baker Oil Tools, pp. 12-13, (Undated).

(Continued)

*Primary Examiner* — William P Neuder
(74) *Attorney, Agent, or Firm* — McDermott Will & Emery LLP; Scott F. Wendorf

(57) ABSTRACT

An apparatus suitable for use in a wellbore comprises an expandable bistable device. An exemplary device has a plurality of bistable cells formed into a tubular shape. Each bistable cell comprises at least two elongated members that are connected to each other at their ends. The device is stable in a first configuration and a second configuration.

28 Claims, 17 Drawing Sheets

(56) References Cited

U.S. PATENT DOCUMENTS 1,981,525 A 11/1934 Price
2,016,683 A 10/1935 Moore
2,050,128 A 8/1936 Schlumberger
2,171,840 A 9/1939 Armentrout
2,217,708 A 10/1940 Scaramucci
2,220,205 A 11/1940 Buckley
2,371,385 A 3/1945 Eckel
2,530,966 A 11/1950 Huber
2,677,466 A 5/1954 Lowe
2,696,169 A 12/1954 Lassiter
2,760,581 A 8/1956 Johnston
2,769,655 A 11/1956 Holmes
2,812,025 A 11/1957 Teague et al.
2,835,328 A 5/1958 Thompson
2,990,017 A 6/1961 Powers
3,069,125 A 12/1962 Hewitt
3,179,168 A 4/1965 Vincent
3,203,451 A 8/1965 Vincent
3,253,842 A 5/1966 Rabe
3,297,092 A 1/1967 Jennings
3,353,599 A 11/1967 Swift
3,358,492 A 12/1967 Richter
3,389,752 A 6/1968 Lebourg
3,414,055 A 12/1968 Vogt
3,415,321 A 12/1968 Venghiattis
3,419,080 A 12/1968 Lebourg
3,463,247 A 8/1969 Klein
3,482,629 A 12/1969 Suman
3,489,220 A 1/1970 Kinley
3,507,340 A 4/1970 Voetter
3,508,587 A 4/1970 Mauch
3,556,219 A 1/1971 Meldau
3,561,529 A 2/1971 Owen
3,604,732 A 9/1971 Malone
3,657,744 A 4/1972 Ersek
3,672,705 A 6/1972 Rush
3,692,114 A 9/1972 Murphey, Jr.
3,785,193 A 1/1974 Kinley
3,816,894 A 6/1974 Howard
3,864,970 A 2/1975 Bell
3,898,717 A 8/1975 Schwartz
3,913,676 A 10/1975 Barbee, Jr.
3,926,409 A 12/1975 Abney
3,963,076 A 6/1976 Winslow
4,064,938 A 12/1977 Fast
4,065,953 A 1/1978 Frentzen
4,185,856 A 1/1980 McCaskill
4,253,522 A 3/1981 Setterberg, Jr.
4,295,527 A 10/1981 Russe
4,309,891 A 1/1982 Pogonowski
4,337,969 A 7/1982 Escaron
4,375,164 A 3/1983 Dodge
4,401,158 A 8/1983 Spencer
4,495,997 A 1/1985 Scott
4,541,486 A 9/1985 Wetzel
4,553,595 A 11/1985 Huang
4,558,219 A 12/1985 LeBlanc
4,558,742 A 12/1985 Huang
4,566,538 A 1/1986 Peterson
4,578,608 A 3/1986 Mech
4,580,568 A 4/1986 Gianturco
4,600,037 A 7/1986 Hatten
4,606,408 A 8/1986 Zunkel
4,626,129 A 12/1986 Kothmann
4,655,771 A 4/1987 Wallsten
4,657,079 A 4/1987 Nagaoka
4,665,906 A 5/1987 Jervis
4,665,918 A 5/1987 Garza
4,706,659 A 11/1987 Matthews
4,733,665 A 3/1988 Palmaz
4,739,762 A 4/1988 Palmaz
4,740,207 A 4/1988 Kreamer
4,783,995 A 11/1988 Michel
4,809,792 A 3/1989 Lynch
4,832,121 A 5/1989 Anderson
4,866,062 A 9/1989 Toth
4,874,327 A 10/1989 Ip
4,886,062 A 12/1989 Wiktor
4,945,991 A 8/1990 Jones
4,950,258 A 8/1990 Kawai
4,969,890 A 11/1990 Sugita
4,976,142 A 12/1990 Perales
4,990,155 A 2/1991 Wilkoff
4,994,071 A 2/1991 MacGregor
5,102,417 A 4/1992 Palmaz
5,104,404 A 4/1992 Wolff
5,107,927 A 4/1992 Whiteley
5,119,373 A 6/1992 Fredricsson
5,141,360 A 8/1992 Zeman
5,147,370 A 9/1992 McNamara
5,156,220 A 10/1992 Forehand
5,163,321 A 11/1992 Perales
5,174,379 A 12/1992 Whiteley
5,186,255 A 2/1993 Corey
5,192,307 A 3/1993 Wall
5,195,984 A 3/1993 Schatz
5,197,978 A 3/1993 Hess
5,211,241 A 5/1993 Mashaw, Jr.
5,226,913 A 7/1993 Pinchuk
5,234,448 A 8/1993 Wholey
5,243,190 A 9/1993 Bandy
5,282,823 A 2/1994 Schwartz
5,318,121 A 6/1994 Brockman
5,329,998 A 7/1994 King
5,337,823 A 8/1994 Nobileau
5,348,095 A 9/1994 Worrall et al.
5,354,308 A 10/1994 Simon
5,355,948 A 10/1994 Sparlin
5,355,949 A 10/1994 Sparlin
5,355,953 A 10/1994 Shy
5,366,012 A 11/1994 Lohbeck
5,377,104 A 12/1994 Sorrells
5,377,823 A 1/1995 Steen et al.
5,383,892 A 1/1995 Cardon
5,383,926 A 1/1995 Lock
5,396,957 A 3/1995 Surjaatmadja
5,397,355 A 3/1995 Marin
5,403,341 A 4/1995 Solar
5,411,507 A 5/1995 Heckele
5,419,760 A 5/1995 Narciso, Jr.
5,449,373 A 9/1995 Pinchasik
5,449,382 A 9/1995 Dayton
5,450,898 A 9/1995 Sparlin
5,456,319 A 10/1995 Schmidt
5,492,175 A 2/1996 El-Rabaa
5,496,365 A 3/1996 Sgro
5,500,013 A 3/1996 Buscemi
5,515,915 A 5/1996 Jones
5,545,208 A 8/1996 Wolff
5,545,210 A 8/1996 Hess
5,554,183 A 9/1996 Nazari
5,556,413 A 9/1996 Lam
5,562,690 A 10/1996 Green
5,562,697 A 10/1996 Christiansen
5,576,485 A 11/1996 Serata
5,601,593 A 2/1997 Freitag
5,618,299 A 4/1997 Khosravi
5,628,787 A 5/1997 Mayer
5,641,023 A 6/1997 Ross
5,643,314 A 7/1997 Carpenter
5,663,805 A 9/1997 Asai
5,667,011 A 9/1997 Gill et al.
5,670,161 A 9/1997 Healy
5,695,516 A 12/1997 Fischell
5,697,971 A * 12/1997 Fischell et al. ..... 623/1.15
5,702,419 A 12/1997 Berry
5,723,781 A 3/1998 Pruett
5,725,570 A 3/1998 Heath
5,725,572 A 3/1998 Lam
5,733,303 A 3/1998 Israel
5,755,774 A 5/1998 Pinchuk
5,755,776 A 5/1998 Al-Saadon
5,776,181 A 7/1998 Lee
5,776,183 A 7/1998 Kanesaka

(56) References Cited

U.S. PATENT DOCUMENTS

| | | | |
|---|---|---|---|
| 5,785,120 | A | 7/1998 | Smalley |
| 5,806,589 | A | 9/1998 | Lang |
| 5,807,404 | A | 9/1998 | Richter |
| 5,824,040 | A | 10/1998 | Cox |
| 5,833,001 | A | 11/1998 | Song |
| 5,842,516 | A | 12/1998 | Jones |
| 5,861,025 | A | 1/1999 | Boudghene |
| 5,865,073 | A | 2/1999 | Wilson |
| 5,871,538 | A | 2/1999 | Dereume |
| 5,872,901 | A | 2/1999 | Konno |
| 5,876,449 | A | 3/1999 | Starck |
| 5,891,191 | A | 4/1999 | Stinson |
| 5,895,406 | A | 4/1999 | Gray |
| 5,896,928 | A | 4/1999 | Coon |
| 5,899,882 | A | 5/1999 | Waksman |
| 5,901,789 | A | 5/1999 | Donnelly et al. |
| 5,913,897 | A | 6/1999 | Corso, Jr. |
| 5,918,672 | A | 7/1999 | McConnell |
| 5,922,020 | A | 7/1999 | Klein |
| 5,924,745 | A | 7/1999 | Campbell |
| 5,928,280 | A | 7/1999 | Hansen |
| 5,934,376 | A | 8/1999 | Nguyen |
| 5,957,195 | A | 9/1999 | Bailey |
| 5,964,296 | A | 10/1999 | Ross |
| 5,972,018 | A | 10/1999 | Israel |
| 5,984,568 | A | 11/1999 | Lohbeck |
| 5,997,580 | A | 12/1999 | Mastrorio |
| 6,004,348 | A | 12/1999 | Banas |
| 6,012,522 | A | 1/2000 | Donnelly |
| 6,012,523 | A | 1/2000 | Campbell |
| 6,013,854 | A | 1/2000 | Moriuchi |
| 6,017,362 | A | 1/2000 | Lau |
| 6,019,789 | A | 2/2000 | Dinh |
| 6,020,981 | A | 2/2000 | Ogiyama |
| 6,021,850 | A | 2/2000 | Wood |
| 6,022,371 | A | 2/2000 | Killion |
| 6,027,526 | A | 2/2000 | Limon |
| 6,027,527 | A | 2/2000 | Asano |
| 6,029,748 | A | 2/2000 | Forsyth et al. |
| 6,031,637 | A | 2/2000 | Shibata |
| 6,042,606 | A | 3/2000 | Frantzen |
| 6,049,597 | A | 4/2000 | Satake |
| 6,063,113 | A | 5/2000 | Kavteladze |
| 6,064,491 | A | 5/2000 | Matsumoto |
| 6,065,500 | A | 5/2000 | Metcalfe |
| 6,070,671 | A | 6/2000 | Cumming |
| 6,083,258 | A | 7/2000 | Yadav |
| 6,095,242 | A | 8/2000 | Lequang |
| 6,096,070 | A | 8/2000 | Ragheb |
| 6,106,548 | A | 8/2000 | Roubin |
| 6,112,818 | A | 9/2000 | Campbell |
| 6,131,662 | A | 10/2000 | Ross |
| 6,135,208 | A | 10/2000 | Gano |
| 6,138,776 | A | 10/2000 | Hart |
| 6,142,230 | A | 11/2000 | Smalley |
| 6,147,774 | A | 11/2000 | Hamadani |
| 6,152,599 | A | 11/2000 | Salter, Jr. |
| 6,190,406 | B1 | 2/2001 | Duerig |
| 6,193,744 | B1 | 2/2001 | Ehr |
| 6,203,569 | B1 | 3/2001 | Wijay |
| 6,206,911 | B1 | 3/2001 | Milo |
| 6,213,686 | B1 | 4/2001 | Baugh |
| 6,220,345 | B1 | 4/2001 | Jones |
| 6,220,361 | B1 | 4/2001 | Brisco |
| 6,227,303 | B1 | 5/2001 | Jones |
| 6,244,360 | B1 | 6/2001 | Steinsland |
| 6,250,385 | B1 | 6/2001 | Montaron |
| 6,253,844 | B1 | 7/2001 | Walker |
| 6,253,850 | B1 | 7/2001 | Nazzai et al. |
| 6,261,319 | B1 | 7/2001 | Kveen |
| 6,263,966 | B1 | 7/2001 | Haut et al. |
| 6,263,972 | B1 | 7/2001 | Richard et al. |
| 6,264,685 | B1 | 7/2001 | Ahari |
| 6,273,634 | B1 | 8/2001 | Lohbeck |
| 6,281,489 | B1 | 8/2001 | Tubel |
| 6,315,040 | B1 | 11/2001 | Donnelly |
| 6,321,503 | B1 | 11/2001 | Warren |
| 6,322,109 | B1 | 11/2001 | Campbell |
| 6,325,148 | B1 | 12/2001 | Trahan |
| 6,327,938 | B1 | 12/2001 | Pietras |
| 6,328,113 | B1 | 12/2001 | Cook |
| 6,330,911 | B1 | 12/2001 | Allen |
| 6,330,918 | B1 | 12/2001 | Hosie |
| 6,343,651 | B1 | 2/2002 | Bixenman |
| 6,360,633 | B2 | 3/2002 | Pietras |
| 6,368,355 | B1 | 4/2002 | Uflacker |
| 6,371,203 | B2 | 4/2002 | Frank |
| 6,374,565 | B1 | 4/2002 | Warren |
| 6,378,614 | B1 | 4/2002 | Adams |
| 6,382,318 | B1 | 5/2002 | Whitlock |
| 6,415,509 | B1 | 7/2002 | Echols |
| 6,425,444 | B1 | 7/2002 | Metcalfe |
| 6,431,271 | B1 | 8/2002 | Thomeer |
| 6,446,729 | B1 | 9/2002 | Bixenman |
| 6,451,052 | B1 | 9/2002 | Burmeister |
| 6,454,493 | B1 | 9/2002 | Lohbeck |
| 6,457,518 | B1 * | 10/2002 | Castano-Mears et al. .... 166/207 |
| 6,457,532 | B1 | 10/2002 | Simpson |
| 6,464,720 | B2 | 10/2002 | Boatman |
| 6,478,091 | B1 | 11/2002 | Gano |
| 6,478,092 | B2 * | 11/2002 | Voll et al. ..... 166/378 |
| 6,485,524 | B2 | 11/2002 | Strecker |
| 6,488,702 | B1 | 12/2002 | Besselink |
| 6,510,896 | B2 | 1/2003 | Bode |
| 6,512,599 | B1 | 1/2003 | Hattori |
| 6,513,599 | B1 | 2/2003 | Bixenman |
| 6,520,254 | B2 | 2/2003 | Hurst |
| 6,527,047 | B1 | 3/2003 | Pietras |
| 6,536,291 | B1 | 3/2003 | Gysling |
| 6,540,777 | B2 | 4/2003 | Stenzel |
| 6,554,064 | B1 | 4/2003 | Restarick |
| 6,571,871 | B2 | 6/2003 | Lauritzen |
| 6,575,245 | B2 | 6/2003 | Hurst |
| 6,578,630 | B2 | 6/2003 | Simpson |
| 6,582,461 | B1 | 6/2003 | Burmeister |
| 6,598,678 | B1 | 7/2003 | Simpson |
| 6,622,797 | B2 | 9/2003 | Sivley, IV |
| 6,634,431 | B2 | 10/2003 | Cook |
| 6,648,071 | B2 | 11/2003 | Hackworth |
| 6,669,718 | B2 | 12/2003 | Besselink |
| 6,675,891 | B2 | 1/2004 | Hailey, Jr. |
| 6,681,854 | B2 | 1/2004 | Danos |
| 6,684,951 | B2 | 2/2004 | Restarick |
| 6,688,395 | B2 | 2/2004 | Maguire |
| 6,688,397 | B2 | 2/2004 | McClurkin |
| 6,695,054 | B2 | 2/2004 | Johnson |
| 6,695,067 | B2 | 2/2004 | Johnson |
| 6,719,064 | B2 | 4/2004 | Price-Smith |
| 6,722,427 | B2 | 4/2004 | Gano |
| 6,722,441 | B2 | 4/2004 | Lauritzen |
| 6,725,918 | B2 | 4/2004 | Gano |
| 6,725,934 | B2 | 4/2004 | Coronado |
| 6,745,845 | B2 | 6/2004 | Cook |
| 6,755,856 | B2 | 6/2004 | Fierens |
| 6,772,836 | B2 * | 8/2004 | Schetky et al. ..... 166/277 |
| 6,789,621 | B2 | 9/2004 | Wetzel |
| 6,799,637 | B2 * | 10/2004 | Schetky et al. ..... 166/384 |
| 6,805,196 | B2 | 10/2004 | Lawrence |
| 6,817,410 | B2 | 11/2004 | Wetzel |
| 6,823,943 | B2 | 11/2004 | Baugh |
| 6,848,510 | B2 | 2/2005 | Bixenman |
| 6,877,553 | B2 | 4/2005 | Cameron |
| 6,896,052 | B2 | 5/2005 | Simpson |
| 6,904,974 | B2 | 6/2005 | Slack |
| 6,907,930 | B2 | 6/2005 | Cavender |
| 6,924,640 | B2 | 8/2005 | Fickert |
| 6,932,161 | B2 | 8/2005 | Cameron |
| 6,962,203 | B2 | 11/2005 | Funchess |
| 6,983,796 | B2 | 1/2006 | Bayne |
| 6,994,167 | B2 | 2/2006 | Ramos |
| 7,036,600 | B2 | 5/2006 | Johnson |
| 7,048,052 | B2 | 5/2006 | Hackworth |
| 7,055,609 | B2 | 6/2006 | Hayes |
| 7,086,476 | B2 | 8/2006 | Johnson |

(56) References Cited

U.S. PATENT DOCUMENTS

| | | | | |
|---|---|---|---|---|
| 7,100,690 | B2 | 9/2006 | Mullen | |
| 7,104,324 | B2 | 9/2006 | Wetzel | |
| 7,108,062 | B2 | 9/2006 | Castano-Mears | |
| 7,131,494 | B2 | 11/2006 | Bixenman | |
| 7,134,501 | B2 | 11/2006 | Johnson | |
| 7,140,446 | B2 | 11/2006 | Metcalfe | |
| 7,156,180 | B2 | 1/2007 | Schetky | |
| 7,168,485 | B2 | 1/2007 | Johnson | |
| 7,168,486 | B2 | 1/2007 | Hackworth | |
| 7,182,134 | B2 | 2/2007 | Wetzel | |
| 7,185,709 | B2 | 3/2007 | Schetky et al. | |
| 7,191,842 | B2 | 3/2007 | Hackworth | |
| 7,222,676 | B2 | 5/2007 | Patel | |
| 7,235,097 | B2 | 6/2007 | Calisse | |
| 7,291,166 | B2 | 11/2007 | Cheng | |
| 7,300,458 | B2 | 11/2007 | Henkes | |
| 7,398,831 | B2 | 7/2008 | Schetky | |
| 7,476,245 | B2 | 1/2009 | Abbate | |
| 7,681,640 | B2 | 3/2010 | Bixenman | |
| 7,758,628 | B2 | 7/2010 | Besselink | |
| 2001/0027339 | A1 | 10/2001 | Boatman | |
| 2001/0044652 | A1* | 11/2001 | Moore | 623/1.16 |
| 2002/0035394 | A1 | 3/2002 | Fierens | |
| 2002/0092649 | A1 | 7/2002 | Bixenman | |
| 2002/0107562 | A1* | 8/2002 | Hart et al. | 623/1.15 |
| 2002/0125009 | A1* | 9/2002 | Wetzel et al. | 166/278 |
| 2003/0074052 | A1 | 4/2003 | Besselink | |
| 2003/0079885 | A1 | 5/2003 | Schetky | |
| 2003/0079886 | A1 | 5/2003 | Schetky | |
| 2003/0199969 | A1 | 10/2003 | Steinke | |
| 2004/0034402 | A1 | 2/2004 | Bales | |
| 2004/0065445 | A1 | 4/2004 | Abercrombie Simpson | |
| 2004/0088043 | A1 | 5/2004 | Klein | |
| 2004/0089454 | A1 | 5/2004 | Hackworth | |
| 2004/0133270 | A1 | 7/2004 | Grandt | |
| 2004/0182581 | A1 | 9/2004 | Schetky | |
| 2004/0193247 | A1* | 9/2004 | Besselink | 623/1.15 |
| 2005/0039927 | A1 | 2/2005 | Wetzel | |
| 2005/0055080 | A1 | 3/2005 | Istephanous | |
| 2005/0163821 | A1 | 7/2005 | Sung | |
| 2005/0182479 | A1 | 8/2005 | Bonsignore | |
| 2006/0037745 | A1 | 2/2006 | Hart et al. | |
| 2006/0217795 | A1 | 9/2006 | Besselink | |
| 2006/0241739 | A1* | 10/2006 | Besselink et al. | 623/1.15 |
| 2007/0084608 | A1 | 4/2007 | Bixenman | |
| 2007/0102153 | A1 | 5/2007 | Bixenman | |
| 2008/0097571 | A1 | 4/2008 | Denison | |
| 2009/0187243 | A1 | 7/2009 | Johnson | |

FOREIGN PATENT DOCUMENTS

| | | | |
|---|---|---|---|
| AU | 2006202182 | A1 | 6/2006 |
| BE | 1014914AS | | 6/2004 |
| CA | 2602435 | | 7/1998 |
| CA | 2359450 | | 4/2002 |
| CA | 2359450 | A1 | 4/2002 |
| CA | 2513263 | | 4/2002 |
| CA | 2513263 | A1 | 4/2002 |
| CA | 2367810 | | 7/2002 |
| CA | 2367810 | A1 | 7/2002 |
| CA | 2544701 | | 7/2002 |
| CA | 2544701 | A1 | 7/2002 |
| DE | 8812719 | | 11/1989 |
| DE | 19728337 | | 1/1999 |
| DE | 10201631 | | 11/2002 |
| DE | 10201631 | A1 | 11/2002 |
| EP | 0274846 | A1 | 7/1988 |
| EP | 0326426 | | 8/1989 |
| EP | 326426 | | 8/1989 |
| EP | 0326462 | A2 | 8/1989 |
| EP | 0335341 | A1 | 10/1989 |
| EP | 0364787 | | 4/1990 |
| EP | 0421729 | | 4/1991 |
| EP | 0540290 | A2 | 5/1993 |
| EP | 587197 | | 3/1994 |
| EP | 0587197 | | 3/1994 |
| EP | 0636345 | | 2/1995 |
| EP | 0664107 | | 7/1995 |
| EP | 0674095 | | 9/1995 |
| EP | 0679372 | | 11/1995 |
| EP | 0688545 | | 12/1995 |
| EP | 0734698 | | 10/1996 |
| EP | 0744164 | | 11/1996 |
| EP | 744164 | | 11/1996 |
| EP | 0779409 | A1 | 6/1997 |
| EP | 0897698 | | 2/1999 |
| EP | 1031329 | A2 | 8/2000 |
| EP | 1042997 | | 10/2000 |
| EP | 1152120 | A2 | 11/2001 |
| EP | 1223305 | | 7/2002 |
| EP | 1223305 | A3 | 11/2002 |
| EP | 1255022 | A1 | 11/2002 |
| FR | 2617721 | A1 | 1/1989 |
| FR | 2642812 | | 8/1990 |
| GB | 2081173 | | 2/1982 |
| GB | 2169515 | | 7/1986 |
| GB | 2175824 | A | 12/1986 |
| GB | 2287093 | A | 9/1995 |
| GB | 2317630 | | 4/1998 |
| GB | 2347448 | | 9/2000 |
| GB | 2355740 | | 5/2001 |
| GB | 2362462 | A | 11/2001 |
| GB | 2366817 | | 3/2002 |
| GB | 2368082 | | 4/2002 |
| GB | 2369382 | A | 4/2002 |
| GB | 2369382 | | 5/2002 |
| GB | 2370301 | | 6/2002 |
| GB | 2370574 | | 7/2002 |
| GB | 2371063 | A | 7/2002 |
| GB | 2371064 | | 7/2002 |
| GB | 2371066 | | 7/2002 |
| GB | 2371574 | | 7/2002 |
| GB | 2379690 | | 3/2003 |
| GB | 2379691 | | 3/2003 |
| GB | 2379692 | | 3/2003 |
| GB | 2379693 | | 3/2003 |
| GB | 2379694 | | 3/2003 |
| GB | 2379694 | A | 3/2003 |
| GB | 2382831 | | 6/2003 |
| GB | 2382831 | A | 6/2003 |
| GB | 2386625 | | 9/2003 |
| GB | 2386625 | A | 9/2003 |
| GB | 2392461 | | 3/2004 |
| GB | 2392461 | A | 3/2004 |
| GB | 2395214 | | 5/2004 |
| GB | 2395214 | A | 5/2004 |
| GB | 2403491 | | 1/2005 |
| GB | 2404683 | | 2/2005 |
| GB | 2404683 | A | 2/2005 |
| GB | 2408531 | | 6/2005 |
| GB | 2408531 | A | 6/2005 |
| GB | 2409694 | | 7/2005 |
| GB | 2409694 | A | 7/2005 |
| GB | 2410273 | | 7/2005 |
| GB | 2410273 | A | 7/2005 |
| JP | A9312743 | | 12/1997 |
| JP | 2002121654 | | 4/2002 |
| JP | 3958602 | | 11/2002 |
| JP | 2002332791 | | 11/2002 |
| NL | 1019192 | | 4/2002 |
| NL | 1019753 | | 7/2002 |
| NL | 1021076 | | 7/2002 |
| NL | 1022037 | | 2/2003 |
| RU | 2225497 | | 7/2003 |
| RU | 2225497 | C2 | 7/2003 |
| RU | 2263198 | | 5/2005 |
| SG | 104956 | | 7/2004 |
| SU | 1105620 | | 7/1984 |
| WO | 8602124 | | 4/1986 |
| WO | 9206734 | A1 | 4/1992 |
| WO | 9219310 | A1 | 11/1992 |
| WO | 9322986 | | 11/1993 |
| WO | 9403127 | A1 | 2/1994 |

(56) References Cited

FOREIGN PATENT DOCUMENTS

| | | | |
|---|---|---|---|
| WO | 9509584 | | 4/1995 |
| WO | 9531945 | | 11/1995 |
| WO | 9532757 | | 12/1995 |
| WO | 9603942 | | 2/1996 |
| WO | 9609013 | | 3/1996 |
| WO | 9618359 | | 6/1996 |
| WO | 9629028 | | 9/1996 |
| WO | 9637680 | | 11/1996 |
| WO | 9641589 | | 12/1996 |
| WO | 9704721 | | 2/1997 |
| WO | 9800626 | | 1/1998 |
| WO | 9820810 | | 5/1998 |
| WO | 9820810 | A1 | 5/1998 |
| WO | 9822690 | | 5/1998 |
| WO | 9826152 | | 6/1998 |
| WO | WO 98/32412 | | 7/1998 |
| WO | 9849423 | A | 11/1998 |
| WO | 9850673 | | 11/1998 |
| WO | 9850680 | | 11/1998 |
| WO | 98049423 | | 11/1998 |
| WO | WO 98/49423 | | 11/1998 |
| WO | 9857030 | | 12/1998 |
| WO | 9902818 | | 1/1999 |
| WO | 9915108 | A2 | 4/1999 |
| WO | 9923354 | | 5/1999 |
| WO | 9945235 | | 9/1999 |
| WO | 0036386 | A1 | 6/2000 |
| WO | 0061908 | | 10/2000 |
| WO | 0129368 | | 4/2001 |
| WO | 0129368 | A1 | 4/2001 |
| WO | 0142620 | | 6/2001 |
| WO | 0142620 | A1 | 6/2001 |
| WO | 0146551 | | 6/2001 |
| WO | 0165063 | | 9/2001 |
| WO | 0165067 | | 9/2001 |
| WO | 0173264 | | 10/2001 |
| WO | 0188332 | A1 | 11/2001 |
| WO | 0192680 | | 12/2001 |
| WO | 0206593 | | 1/2002 |
| WO | 0206625 | | 1/2002 |
| WO | WO 02/25057 | | 3/2002 |
| WO | 02020023 | A | 7/2002 |
| WO | 308384 | | 2/2004 |
| WO | 2004014255 | A1 | 2/2004 |
| WO | WO 2004/014255 | | 2/2004 |
| WO | 03004598 | A | 4/2004 |
| WO | 200707605 | A3 | 7/2007 |
| WO | 2007076051 | | 7/2007 |
| WO | 2007126729 | | 11/2007 |
| WO | 2007126729 | A3 | 11/2007 |

OTHER PUBLICATIONS

Sides, Win, Hydraulic Intelligent Completions, Baker Hughes, Advanced Technology Conference, Sep. 30-Oct. 1, 1999, slides 1-28 (6446729).

STDZ and Multizone Completion Systems, Halliburton Company, 1995.

Hamid, Syed, Lester, G. Scott and Adkins, Darrel W.; A Fiber-Optic Iinspection System for Prepacked Screens: Society of Petroleum Engineers Inc.: pp. 1-12. Apr. 1999.

U.S. Pre-Grant Pub 2003/0056947, Cameron, Mar. 2003. Hamid, Syed, Lester, G. Scott and Adkins. Darrell W.; A Fiber-Optic Inspection System for Prepacked Screens: Society of Petroleum Engineers Inc.; pp. 1-9, 1999.

Hackworth et al., Development and First Application of Bistable Expandable Sand Screen, Oct. 5-8, 2003, SPE 84265, whole document.

European Search Report dated Mar. 15, 2006 re EP 05 02 2622 (PARGN.002VR1 EP) in 4 pages.

European Search Report dated Jul. 21, 2008 re EP 05 02 2622 (PARGN.002VR1EP) in 4 pages.

[Proposed] Order Granting Schlumberger Technology Corporation's Motion to Dismiss Kentucky Oil Technology's First Amended Third, Fourth, Fifth, and Sixth Counterclaims, *Memry Corporation* v. *Kentucky Oil Technology, N.V.,* Case No. C-04-03843, (N.D. Cal.), filed Feb. 24, 2005 (3 pages).

Answer of Defendants and Counterclaims of Kentucky Oil Technology N.V. Against Memry Corporation and Schlumberger Technology Corporation, *Memry Corporation* v. *Kentucky Oil Technology, N.V.,* Case No. C-04 03843, (N.D. Cal.) filed Nov. 2, 2004 (20 pages).

Schlumberger Technology Corporation's Answer to Kentucky Oil Technology's Second Amended Counterclaims, *Memry Corporation* v. *Kentucky Oil Technology, N.V.,* Case No. C-04-03843, (N.D. Cal.), filed Jul. 28, 2005 (8 pages).

Office Action for U.S. Appl. No. 12/872,154 dated Feb. 25, 2011.

Office Action for U.S. Appl. No. 12/872,203 dated Mar. 3, 2011.

Office Action for U.S. Appl. No. 12/872,220 dated Mar. 3, 2011.

Besselink, Peter; Biftex Stents; SMST-99: Proceedings of the First European Conference on Shape Memory and Superelastic Technologies, Antwerp Zoo, Belgium, 1999; pp. 142-150.

Docket Sheet for *Memry Corporation* v. *Kentucky Oil Technology,* N.V., Case No. H-04-1959 (S.D. Tex.) (PACER Jun. 2, 2005) (5 pages).

Docket Sheet for *Memry Corporation* v. *Kentucky Oil Technology,* N.V., Case No. C-04-03843, (N.D. Cal.) (PACER Aug. 11, 2005) (13 pages).

Communication from United States District Court Transferring Case, *Memry Corporation* v. *Kentucky Oil Technology,* N.V., Case No. H-04-1959 (S.D. Tex.), dated Sep. 7, 2004 (1 page).

Plaintiffs' Original Complaint, *Memry Corporation* v. *Kentucky Oil Technology,* N.V., Case No. H-04-1959, (S.D. Tex.), filed May 14, 2004 (20 pages).

Defendants' Motions (1) to Dismiss the Complaint for Insufficiency of Process and Lack of Personal Jurisdiction, (2) to Dismiss Counts I-III of the Complaint for Failure to State a Claim, and (3) in the Alternative, to Transfer This Action to the Federal District Court for the Northern District of California, *Memry Corporation* v. *Kentucky Oil Technology,* N.V., Case No. H-04-1959, (S.D. Tex.), filed Jul. 7, 2004 (49 pages).

Plaintiff's First Amended Complained, *Memry Corporation* v. *Kentucky Oil Technology,* N.V., Case No. C-04-03843. (N.D. Cal.), filed Aug. 19, 2004 (20 pages).

Answer of Defendants and Counterclaims of Kentucky Oil Technology N.V. Against Memry Corporation and Schlumberger Technology Corporation, *Memry Corporation* v. *Kentucky Oil Technology,* N.V., Case No. C-04-03843, (N.D. Cal.) filed Nov. 2, 2004 (20 pages).

Plaintiff and Counterdefendant Memry Corporation's Answer to Kentucky Oil Technology N.V.'s Counterclaims and Demand for Jury Trial, *Memry Corporation* v. *Kentucky Oil Technology,* N.V., Case No. C-04-03843, (N.D. Cal.), filed Dec. 3, 2004 (10 pages).

Schlumberger Technology Corporation's Notice of Motion and Motion to Dismiss Kentucky Oil Technology's Third, Fourth, Fifth, and Sixth Counterclaims; and Memorandum of Points and Authorities, *Memry Corporation* v. *Kentucy Oil Technology,* N.V., Case No. C-04-03843. (N.D. Cal.) filed Jan. 24, 2005 (32 pages).

[Proposed] Order Granting Schlumberger Technology Corporation's Motion to Dismiss Kentucky Oil Technology's Third, Fourth, Fifth, and Sixth Counterclaims, *Memry Corporation* v. *Kentucky Oil Technology,* N.V., Case No. C-04-03843, (N.D. Cal.), filed Jan. 24, 2005 (3 pages).

First Amended Counterclaims of Kentucky Oil Technology N.V. Against Memry Corporation and Schlumberger Technology Corporation, *Memry Corporation* v. *Kentucky Oil Technology,* N.V., Case No. C-04-03843, (N.D. Cal.), filed Feb. 9, 2005 (16 pages).

Schlumberger Technology Corporation's Notice of Motion and Motion to Dismiss Kentucky Oil Technology's First Amended Third, Fourth, Fifth, and Sixth Counterclaims; and Memorandum of Points and Authorities, *Memry Corporation* v. *Kentucky Oil Technology,* N.V., Case No. C-04-03843, (N.D. Cal.), filed Feb. 24, 2005, 32 pages).

Request for Judicial Notice in Support of Schlumberger Technology Corporation's Motion to Dismiss Kentucky Oil Technology's First Amended Third, Fourth, Fifth, and Sixth Counterclaims, *Memry*

(56) References Cited

OTHER PUBLICATIONS

*Corporation* v. *Kentucky Oil Technology,* N.V., Case No. C-04-03843, (N.D. Cal.), filed Feb. 24, 2005 (3 pages).
Plaintiff and Counterdefendant Memry Corporation's Notice of Motion and Motion to Dismiss Kentucky Oil Technology's Third, Fourth, Fifth, and Sixth Counterclaims; and Memorandum of Points and Authorities, *Memry Corporation* v. *Kentucky Oil Technology,* N.V., Case No. C-04-03843, (N.D. Cal.), filed Feb. 25, 2005 (29 pages).
Request for Judicial Notice in Support of Memry Corporation's Motion to Dismiss Kentucky Oil Technology's Third, Fourth, Fifth, and Sixth Counterclaims, *Memry Corporation* v. *Kentucky Oil Technology,* N.V., Case No. C-04-03843, (N.D. Cal.), filed Feb. 25, 2005 (3 pages).
[Proposed] Order Granting Memry Corporation's Motion to Dismiss Kentucky Oil Technology's Third Fourth, Fifth, and Sixth Counterclaims, *Memry Corporation* v. *Kentucky Oil Technology,* N.V. Case No. C-04-03843, (N.D. Cal), filed Feb. 25, 2005 (3 pages).
Opposition of Kentucky Oil to Motions of Memry Corporation and Schlumberger Technology Corporation to Dismiss First Amended Counterclaims, *Memry Corporation* v. *Kentucky Oil Technology,* N.V., Case No. C-04-03843, (N.D. Cal.), filed Mar. 11, 2005 (29 pages).
Kentucky Oil's Opposition to Counterdefendants' Requests for Judicial Notice in Support of Their Motions to Dismiss Kentucky Oil Technology's First Amended Third, Fourth, Fifth, and Sixth Counterclaims, *Memry Corporation* v. *Kentucky Oil Technology,* N.V., Case No. C-04-03843, (N.D. Cal.), filed Mar. 11, 2005 (3 pages).
Plaintiff and Counterdefendant Memry Corporation's Reply in Support of Motion to Dismiss Kentucky Oil Technology's Third, Fourth, Fifth, and Sixth Counterclaims, *Memry Corporation* v. *Kentucky Oil Technology,* N.V., Case No. C-04-03843, (N.D. Cal.), filed Mar. 18, 2005 (9 pages).
Plaintiff and Counterdefendant Memry Corporation's Reply in Support of Request for Judicial Notice, *Memry Corporation* v. *Kentucky Oil Technology,* N.V., Case No. C-04-03843, (N.D. Cal.), filed Mar. 18, 2005 (4 pages).
Reply of Schlumberger Technology Corporation to Kentucky Oil Technology's Opposition to First Amended, Third, Fourth, Fifth, and Sixth Counterclaims, *Memry Corporation* v. *Kentucky Oil Technology,* N.V., Case No. C-04-03843, (N.D. Cal.), filed Mar. 18, 2005 (17 pages).
Schlumberger's Response to Kentucky Oil's Opposition to Counterdefendants' Requests for Judicial Notice, *Memry Corporation* v. *Kentucky Oil Technology,* N.V., Case No. C-04-03843, (N.D. Cal.), filed Mar. 18, 2005 (3 pages).
Schlumberger's Notice of Motion and Motion to Strike Exhibits 1, 2, and 4 to the Declaration of Nicola A. Pizano, *Memry Corporation* v. *Kentucky Oil Technology,* N.V., Case No. C-04-03843, (N.D. Cal.), filed Mar. 18, 2005 (3 pages).
Kentucky Oil's Opposition on STC's Motion to Strike Exhibits 1, 3 and 4 to the Declaration of Nicola A. Pisano, *Memry Corporation* v. *Kentucky Oil Technology,* N.V., Case No. C-04-03843, (N.D. Cal.), filed Mar. 25, 2005 (3 pages).
Kentucky Oil's Notice of Motion and Motion to Strike Decleration of Benjamin Holl and Portions of Counterdefendants' Reply Briefs, *Memry Corporation* v. *Kentucky Oil Technology,* N.V., Case No. C-04-03843, (N.D. Cal.), filed Mar. 25, 2005 (4 pages).
[Proposed] Order Granting Kentucky Oil's Motion to Stricke Decleration of Benjamin Holl and Portions of Counterdefendants' Reply Briefs, *Memry Corporation* v. *Kentucky Oil Technology,* (N.V., Case No. C-04-03843, (N.D. Cal.), entered Mar. 25, 2005 (2 pages).
Order Granting in Part and Denying in Part Counterdefendants' Motion to Dismiss, *Memry Corporation* v. *Kentucky Oil Technology,* N.V., Case No. C-04-03843, (N.D. Cal.), entered Apr. 8, 2005 (26 pages).
Plaintiff and Counterdefendant Memry Corporation's Reply to Kentucky Oil Technology N.V.'s Counterclaims and Demand for Jury Trial, *Memry Corporation* v. *Kentucky Oil Technology,* N.V., Case No. C-04-03843, (N.D. Cal.), filed Apr. 18, 2005 (8 pages).
Second Amended Counterclaims of Kentucky Oil Technology N.V. Against Memry Corporation and Schlumberger Technology Corporation, *Memry Corporation* v. *Kentucky Oil Technology,* N.V., Case No. C-04-03843, (N.D. Cal.), filed May 6, 2005 (20 pages).
Plaintiff Memry Corporation's Reply to Kentucky Oil Technology N.V.'s Second Amended Counterclaims and Demand for Jury Trial, *Memry Corporation* v. *Kentucky Oil Technology,* N.V., Case No. C-04-03843, (N.D. Cal.), filed Jun. 3, 2005 (9 pages).
Schlumberger Technology Corporation's Notice of Motion and Motion to Dismiss the Fourth, Fifth, Sixth, Seventh and Eighth Counterclaims in Kentucky Oil Technology's Second Amended Counterclaims, *Memry Corporation* v. *Kentucky Oil Technology,* N.V., Case No. C-04-03843, (N.D. Cal.), filed Jun. 3, 2005 (18 pages).
Opposition of Kentucky Oil Technology to Schlumberger Technology Corporation's Motion to Dismiss Kentucky Oil's Second Amended Counterclaims, *Memry Corporation* v. *Kentucky Oil Technology,* N.V., Case No. C-04-03843, (N.D. Cal.), filed Jun. 17, 2005 (16 pages).
Schlumberger Technology Corporation's Reply Brief in Support of its Motion to Dismiss the Fourth, Fifth, Sixth, Seventh and Eighth Counterclaims in Kentucky Oil Technology's Second Amended Counterclaims, *Memry Corporation* v. *Kentucky Oil Technology,* N.V., Case No. C-04-03843, (N.D. Cal.), filed Jun. 24, 2005 (11 pages).
Order Granting in Part and Denying In Part STC's Motion to Dismiss, *Memry Corporation* v. *Kentucky Oil Technology,* N.V., Case No. C-04-03843, (N.D. Cal.), entered Jul. 14, 2005 (8 pages).
Notice o Motion and Motion by Kentucky Oil To Compel Production of Documents by Schlumberger Technology Corporation Pursuant to Fed. R. Civ. Rule 37: Memorandum of Points and Authorities in Support Thereof; Decleration of Michael Bierman, *Memry Corporation* v. *Kentucky Oil Technology,* N.V., Case No. C-04-03843, (N.D. Cal.), filed Jul. 28, 1005 (32 pages).
Schlumberger Technology Corporation's Opposition to Kentucky Oil Technology's Motion to Compel, *Memry Corporation* v. *Kentucky Oil Technology,* N.V., Case No. C-04-03843, (N.D. Cal.), filed Aug. 4, 2005 (21 pages).
Declaration of David B. Moyer in Support of Schlumberger Technology Corporation's Opposition to Kentucky Oil Technology's Motion to Compel, *Memry Corporation* v. *Kentucky Oil Technology,* N.V., Case No. C-04-03843, (N.D. Cal.), filed Aug. 4, 2005 (52 pages).
Kentucky Oil's Reply in Support of Motion to Compel, *Memry Corporation* v. *Kentucky Oil Technology,* N.V., Case No. C-04-03843, (N.D. Cal.), filed Aug. 10, 2005 (18 pages).
Declaration of Nicola A. Pisano in Support of Kentucky Oil's Motion to Compel, *Memry Corporation* v. *Kentucky Oil Technology,* N.V., Case No. C-04-03843, (N.D. Cal.), filed Aug. 10, 2005 (69 pages).
Order Granting Kentucky Oil's Motion to Compel Production of Documents, *Memry Corporation* v. *Kentucky Oil Technology,* N.V., Case No. C-04-03843, (N.D. Cal.), entered Aug. 17, 2005 (8 pages).
US 6,706,063, Mar. 2004, Besselink (withdrawn).
US 6,706,063, 03/2004, Besselink (withdrawn)

* cited by examiner

EXPANDABLE TUBING AND METHOD

Matter enclosed in heavy brackets [ ] appears in the original patent but forms no part of this reissue specification; matter printed in italics indicates the additions made by reissue.

CROSS REFERENCE TO RELATED APPLICATIONS

The following is a continuation of U.S. patent application Ser. No. 09/973,442 filed Oct. 9, 2001 now U.S. Pat. No. 6,799,637 which application claims the priority of provisional application No. 60/242,276 filed Oct. 20, 2000 and provisional application No. 60/263,941 filed Jan. 24, 2001.

FIELD OF THE INVENTION

This invention relates to equipment that can be used in the drilling and completion of wellbores in an underground formation and in the production of fluids from such wells.

BACKGROUND OF THE INVENTION

Fluids such as oil, natural gas and water are obtained from a subterranean geologic formation (a "reservoir") by drilling a well that penetrates the fluid-bearing formation. Once the well has been drilled to a certain depth the borehole wall must be supported to prevent collapse. Conventional well drilling methods involve the installation of a casing string and cementing between the casing and the borehole to provide support for the borehole structure. After cementing a casing string in place, the drilling to greater depths can commence. After each subsequent casing string is installed, the next drill bit must pass through the inner diameter of the casing. In this manner each change in casing requires a reduction in the borehole diameter. This repeated reduction in the borehole diameter creates a need for very large initial borehole diameters to permit a reasonable pipe diameter at the depth where the wellbore penetrates the producing formation. The need for larger boreholes and multiple casing strings results in more time, material and expense being used than if a uniform size borehole could be drilled from the surface to the producing formation.

Various methods have been developed to stabilize or complete uncased boreholes. U.S. Pat. No. 5,348,095 to Worrall et al. discloses a method involving the radial expansion of a casing string to a configuration with a larger diameter. Very large forces are needed to impart the radial deformation desired in this method. In an effort to decrease the forces needed to expand the casing string, methods that involve expanding a liner that has longitudinal slots cut into it have been proposed (U.S. Pat. Nos. 5,366,012 and 5,667,011). These methods involve the radial deformation of the slotted liner into a configuration with an increased diameter by running an expansion mandrel through the slotted liner. These methods still require significant amounts of force to be applied throughout the entire length of the slotted liner.

A problem sometimes encountered while drilling a well is the loss of drilling fluids into subterranean zones. The loss of drilling fluids usually leads to increased expenses but can result in a borehole collapse and a costly "fishing" job to recover the drill string or other tools that were in the well. Various additives are commonly used within the drilling fluids to help seal off loss circulation zones, such as cottonseed hulls or synthetic fibers.

Once a well is put in production an influx of sand from the producing formation can lead to undesired fill within the wellbore and can damage valves and other production related equipment. Many methods have been attempted for sand control.

The present invention is directed to overcoming, or at least reducing the effects of one or more of the problems set forth above, and can be useful in other applications as well.

SUMMARY OF THE INVENTION

According to the present invention, a technique is provided for use of an expandable bistable device in a borehole. The bistable device is stable in a first contracted configuration and a second expanded configuration. An exemplary device is generally tubular, having a larger diameter in the expanded configuration than in the contracted configuration. The technique also may utilize a conveyance mechanism able to transport the bistable device to a location in a subterranean borehole. Furthermore, the bistable device can be constructed in various configurations for a variety of applications.

BRIEF DESCRIPTION OF THE DRAWINGS

The invention will hereafter be described with reference to the accompanying drawings, wherein like reference numerals denote like elements, and.

Figure 1A:
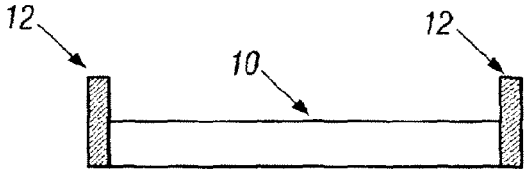
FIGS. 1A and 1B are illustrations of the forces imposed to make a bistable structure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF EXEMPLARY EMBODIMENTS

Figure 1B:
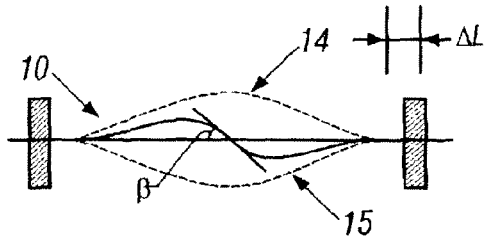

Bistable devices used in the present invention can take advantage of a principle illustrated in FIGS. 1A and 1B. FIG. 1A shows a rod 10 fixed at each end to rigid supports 12. If the rod 10 is subjected to an axial force it begins to deform as shown in FIG. 1B. As the axial force is increased rod 10 ultimately reaches its Euler buckling limit and deflects to one of the two stable positions shown as 14 and 15. If the buckled rod is now clamped in the buckled position, a force at right angles to the long axis can cause the rod to move to either of the stable positions but to no other position. When the rod is subjected to a lateral force it must move through an angle $\beta$ before deflecting to its new stable position.

Figure 2A:
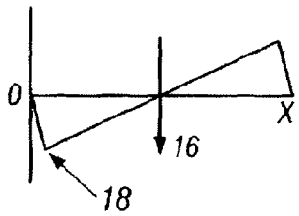
FIGS. 2A and 2B show force-deflection curves of two bistable structures.
Figure 2B:
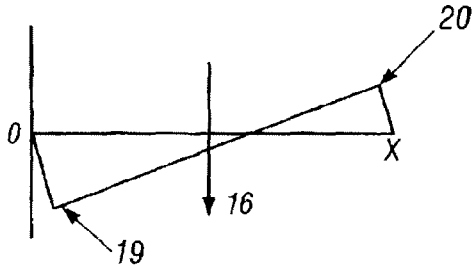

Bistable systems are characterized by a force deflection curve such as those shown in FIGS. 2A and 2B. The externally applied force 16 causes the rod 10 of FIG. 1B to move in the direction X and reaches a maximum 18 at the onset of shifting from one stable configuration to the other. Further deflection requires less force because the system now has a negative spring rate and when the force becomes zero the deflection to the second stable position is spontaneous.

The force deflection curve for this example is symmetrical and is illustrated in FIG. 2A. By introducing either a precurvature to the rod or an asymmetric cross section the force deflection curve can be made asymmetric as shown in FIG. 2B. In this system the force 19 required to cause the rod to assume one stable position is greater than the force 20 required to cause the reverse deflection. The force 20 must be greater than zero for the system to have bistable characteristics.

Bistable structures, sometimes referred to as toggle devices, have been in industry for such devices as flexible discs, over center clamps, hold-down devices and quick release systems for tension cables (such as in sailboat rigging backstays).

Figure 3A:
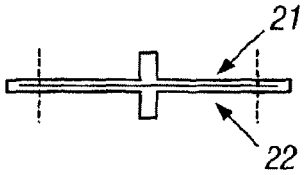
FIGS. 3A-3F illustrate expanded and collapsed states of three bistable cells with various thickness ratios.
Figure 3B:
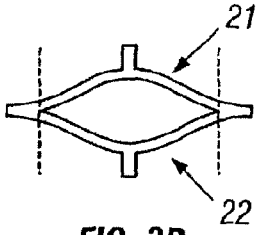
Figure 3C:
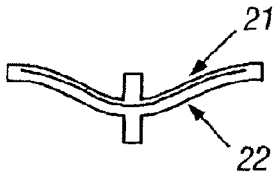
Figure 3D:
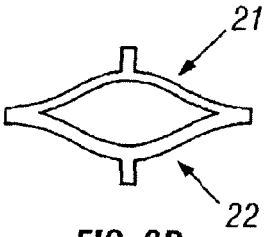
Figure 3E:
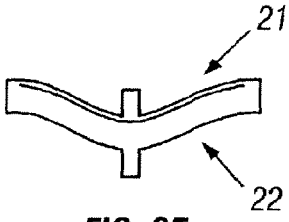
Figure 3F:
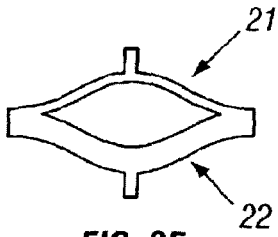

Instead of using the rigid supports as shown in FIGS. 1A and 1B, a cell can be constructed where the restraint is provided by curved struts connected at each end as shown in FIGS. 3A-3F. If both struts 21 and 22 have the same thickness as shown in FIGS. 3A and 3B, the force deflection curve is linear and the cell lengthens when compressed from its open position FIG. 3B to its closed position FIG. 3A. If the cell struts have different thicknesses, as shown in FIGS. 3C-3F, the cell has the force deflection characteristics shown in FIG. 2B, and does not change in length when it moves between its two stable positions. An expandable bistable tubular can thus be designed so that as the radial dimension expands, the axial length remains constant. In one example, if the thickness ratio is over approximately 2:1, the heavier strut resists longitudinal changes. By changing the ratio of thick-to-thin strut dimensions, the opening and closing forces can be changed. For example, FIGS. 3C and 3D illustrated a thickness ratio of approximately 3:1, and FIGS. 3E and 3F illustrate a thickness ratio of approximately 6:1.

Figure 4A:
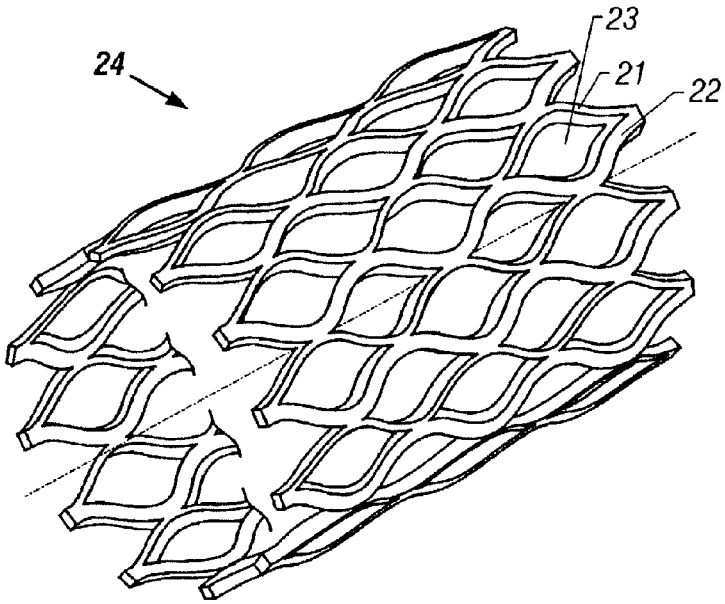
FIGS. 4A and 4B illustrate a bistable expandable tubular in its expanded and collapsed states.
Figure 4B:
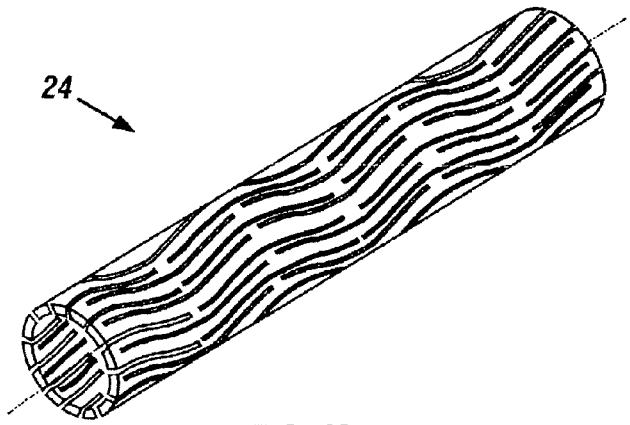
Figure 4C:
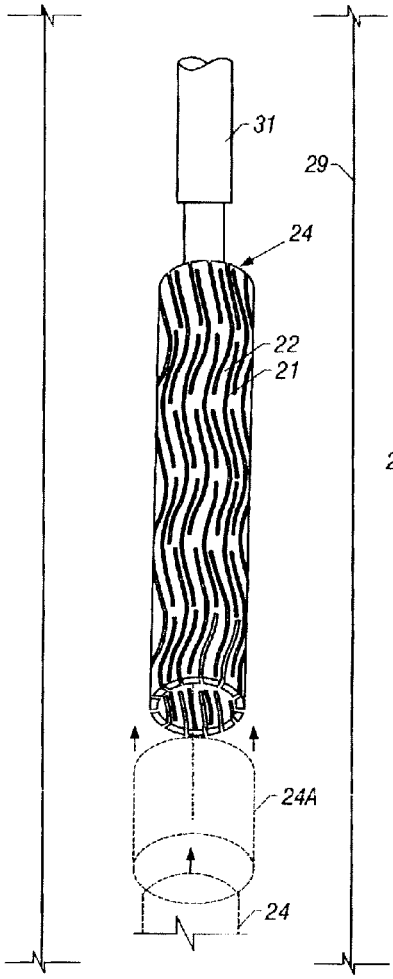
FIGS. 4C and 4D illustrate a bistable expandable tubular in collapsed and expanded states within a wellbore.
Figure 4D:
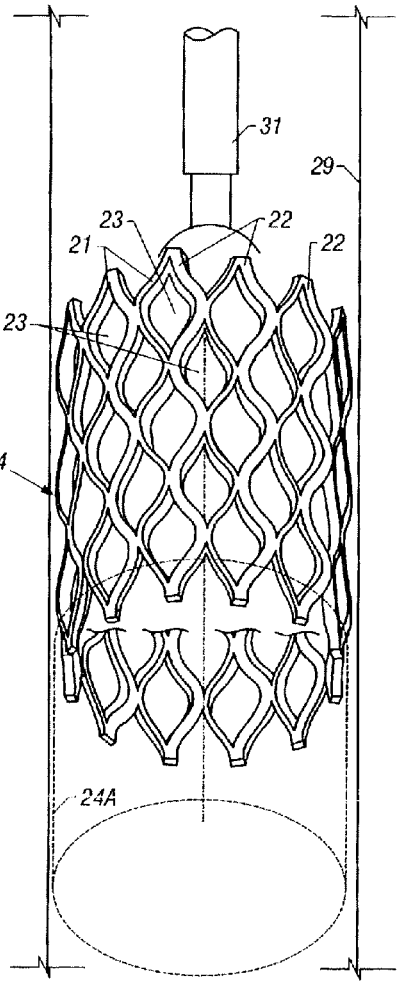

An expandable bore bistable tubular, such as casing, a tube, a patch, or pipe, can be constructed with a series of circumferential bistable connected cells 23 as shown in FIGS. 4A and 4B, where each thin strut 21 is connected to a thick strut 22. The longitudinal flexibility of such a tubular can be modified by changing the length of the cells and by connecting each row of cells with a compliant link. Further, the force deflection characteristics and the longitudinal flexibility can also be altered by the design of the cell shape. FIG. 4A illustrates an expandable bistable tubular 24 in its expanded configuration while FIG. 4B illustrates the expandable bistable tubular 24 in its contracted or collapsed configuration. Within this application the term "collapsed" is used to identify the configuration of the bistable element or device in the stable state with the smallest diameter, it is not meant to imply that the element or device is damaged in any way. In the collapsed state, bistable tubular 24 is readily introduced into a wellbore 29, as illustrated in FIG. 4C. Upon placement of the bistable tubular 24 at a desired wellbore location, it is expanded, as illustrated in FIG. 4D.

The geometry of the bistable cells is such that the tubular cross-section can be expanded in the radial direction to increase the overall diameter of the tubular. As the tubular expands radially, the bistable cells deform elastically until a specific geometry is reached. At this point the bistable cells move, e.g. snap, to a final expanded geometry. With some materials and/or bistable cell designs, enough energy can be released in the elastic deformation of the cell (as each bistable cell snaps past the specific geometry) that the expanding cells are able to initiate the expansion of adjoining bistable cells past the critical bistable cell geometry. Depending on the deflection curves, a portion or even an entire length of bistable expandable tubular can be expanded from a single point.

In like manner if radial compressive forces are exerted on an expanded bistable tubular, it contracts radially and the bistable cells deform elastically until a critical geometry is reached. At this point the bistable cells snap to a final collapsed structure. In this way the expansion of the bistable tubular is reversible and repeatable. Therefore the bistable tubular can be a reusable tool that is selectively changed between the expanded state as shown in FIG. 4A and the collapsed state as shown in FIG. 4B.

In the collapsed state, as in FIG. 4B, the bistable expandable tubular is easily inserted into the wellbore and placed into position. A deployment device is then used to change the configuration from the collapsed state to the expanded state.

In the expanded state, as in FIG. 4A, design control of the elastic material properties of each bistable cell can be such that a constant radial force can be applied by the tubular wall to the constraining wellbore surface. The material properties and the geometric shape of the bistable cells can be designed to give certain desired results.

Figure 11:
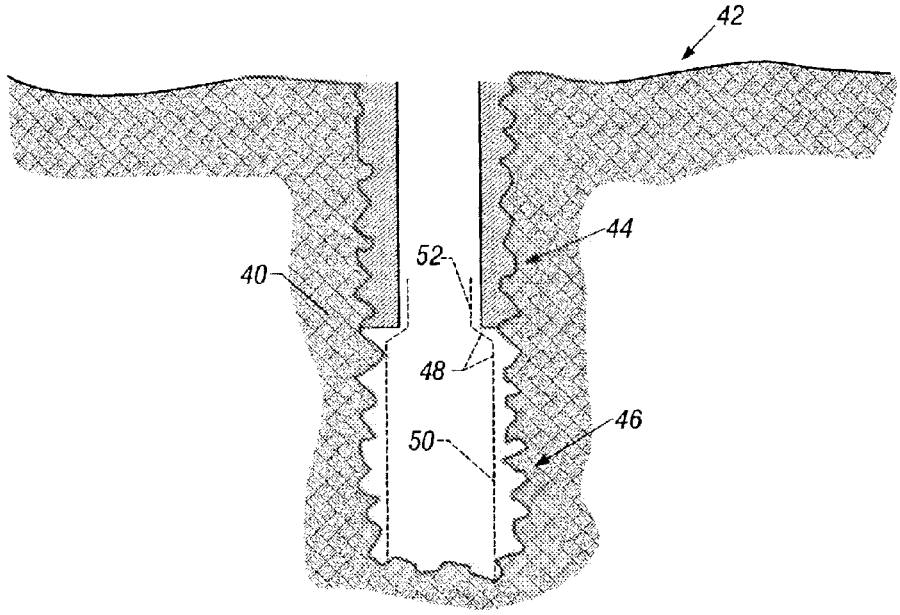
FIG. 11 is a schematic of a wellbore utilizing an expandable bistable tubular.

One example of designing for certain desired results is an expandable bistable tubular string with more than one diameter throughout the length of the string. This can be useful in boreholes with varying diameters, whether designed that way or as a result of unplanned occurrences such as formation washouts or keyseats within the borehole. This also can be beneficial when it is desired to have a portion of the bistable expandable device located inside a cased section of the well while another portion is located in an uncased section of the well. FIG. 11 illustrates one example of this condition. A wellbore 40 is drilled from the surface 42 and comprises a cased section 44 and an openhole section 46. An expandable bistable device 48 having segments 50, 52 with various diameters is placed in the well. The segment with a larger diameter 50 is used to stabilize the openhole section 46 of the well, while the segment having a reduced diameter 52 is located inside the cased section 44 of the well.

Bistable collars or connectors 24A (see FIG. 4C) can be designed to allow sections of the bistable expandable tubular to be joined together into a string of useful lengths using the same principle as illustrated in FIGS. 4A and 48. This bistable connector 24A also incorporates a bistable cell design that allows it to expand radially using the same mechanism as for the bistable expandable tubular component. Exemplary bistable connectors have a diameter slightly larger than the expandable tubular sections that are being joined. The bistable connector is then placed over the ends of the two sections and mechanically attached to the expandable tubular sections. Mechanical fasteners such as screws, rivets or bands can be used to connect the connector to the tubular sections. The bistable connector typically is designed to have an expansion rate that is compatible with the expandable tubular sections, so that it continues to connect the two sections after the expansion of the two segments and the connector.

Alternatively, the bistable connector can have a diameter smaller than the two expandable tubular sections joined. Then, the connector is inserted inside of the ends of the tubulars and mechanically fastened as discussed above. Another embodiment would involve the machining of the ends of the tubular sections on either their inner or outer surfaces to form an annular recess in which the connector is located. A connector designed to fit into the recess is placed in the recess. The connector would then be mechanically attached to the ends as described above. In this way the connector forms a relatively flush-type connection with the tubular sections.

A conveyance device 31 transports the bistable expandable tubular lengths and bistable connectors into the wellbore and to the correct position. (See FIGS. 4C and 4D). The conveyance device may utilize one or more mechanisms such as wireline cable, coiled tubing, coiled tubing with wireline conductor, drill pipe, tubing or casing.

A deployment device 33 can be incorporated into the bottom hole assembly to expand the bistable expandable tubular and connectors. (See FIGS. 4C and 4D). Deployment devices can be of numerous types such as an inflatable packer element, a mechanical packer element, an expandable swage, a piston apparatus, a mechanical actuator, an electrical solenoid, a plug type apparatus, e.g. a conically shaped device pulled or pushed through the tubing, a ball type apparatus or a rotary type expander as further discussed below.

Figure 5A:
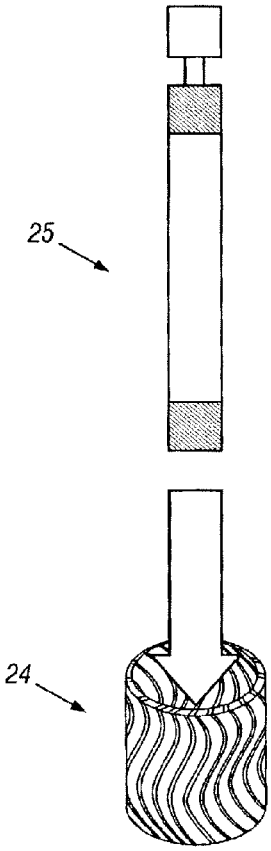
FIGS. 5A and 5B illustrate an expandable packer type of deployment device.
Figure 5B:
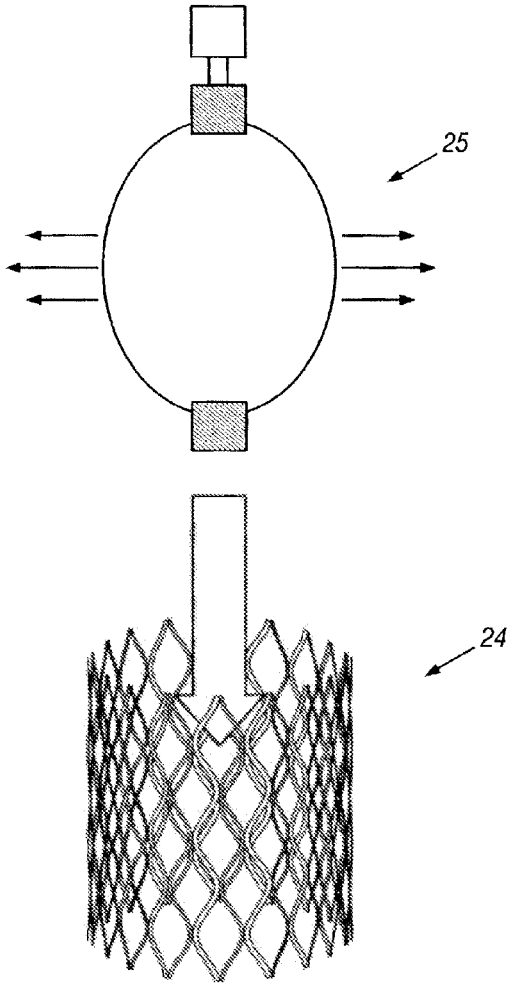

An inflatable packer element is shown in FIGS. 5A and 5B and is a device with an inflatable bladder, element, or bellows incorporated into the bistable expandable tubular system bottom hole assembly. In the illustration of FIG. 5A, the inflatable packer element 25 is located inside the entire length, or a portion, of the initial collapsed state bistable tubular 24 and any bistable expandable connectors (not shown). Once the bistable expandable tubular system is at the correct deployment depth, the inflatable packer element 25 is expanded radially by pumping fluid into the device as shown in FIG. 5B. The inflation fluid can be pumped from the surface through tubing or drill pipe, a mechanical pump, or via a downhole electrical pump which is powered via wireline cable. As the inflatable packer element 25 expands, it forces the bistable expandable tubular 24 to also expand radially. At a certain expansion diameter, the inflatable packer element causes the bistable cells in the tubular to reach a critical geometry where the bistable "snap" effect is initiated, and the bistable expandable tubular system expands to its final diameter. Finally the inflatable packer element 25 is deflated and removed from the deployed bistable expandable tubular 24.

Figures 6A, 6B:
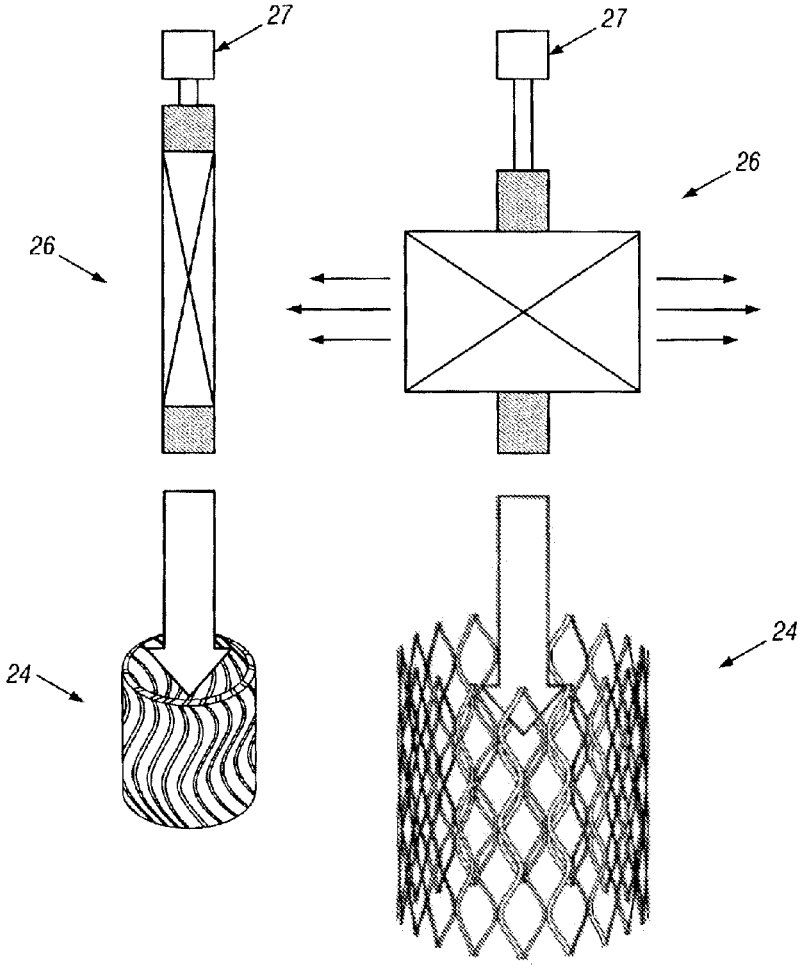
FIGS. 6A and 6B illustrate a mechanical packer type of deployment device.

A mechanical packer element is shown in FIGS. 6A and 6B and is a device with a deformable plastic element 26 that expands radially when compressed in the axial direction. The force to compress the element can be provided through a compression mechanism 27, such as a screw mechanism, cam, or a hydraulic piston. The mechanical packer element deploys the bistable expandable tubulars and connectors in the same way as the inflatable packer element. The deformable plastic element 26 applies an outward radial force to the inner circumference of the bistable expandable tubulars and connectors, allowing them in turn to expand from a contracted position (see FIG. 6A) to a final deployment diameter (see FIG. 6B).

Figure 7A:
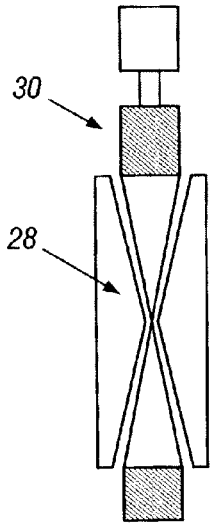
FIGS. 7A-7D illustrate an expandable swage type of deployment device.
Figure 7B:
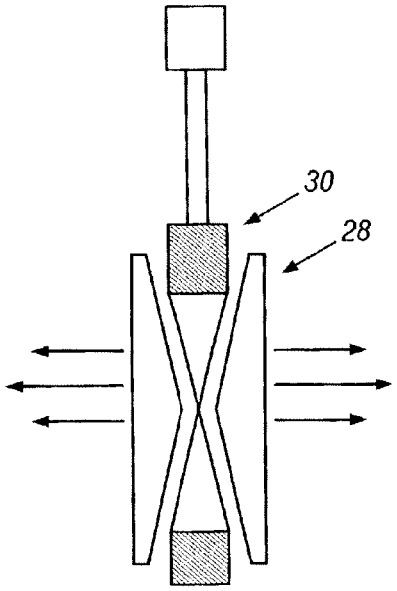
Figure 7C:
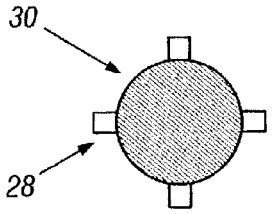
Figure 7D:
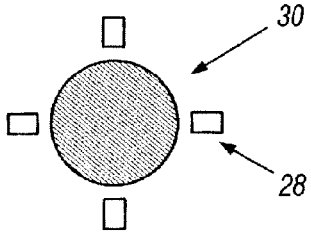

An expandable swage is shown in FIGS. 7A-7D and comprises a series of fingers 28 that are arranged radially around a conical mandrel 30. FIGS. 7A and 7C show side and top views respectively. When the mandrel 30 is pushed or pulled through the fingers 28 they expand radially outwards, as illustrated in FIGS. 7B and 7D. An expandable swage is used in the same manner as a mechanical packer element to deploy a bistable expandable tubular and connector.

Figure 8A:
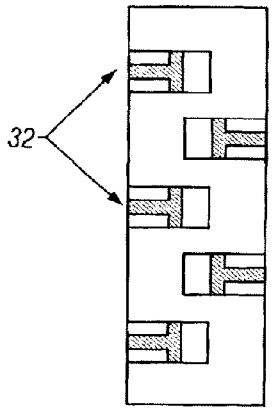
FIGS. 8A-8D illustrate a piston type of deployment device.
Figure 8B:
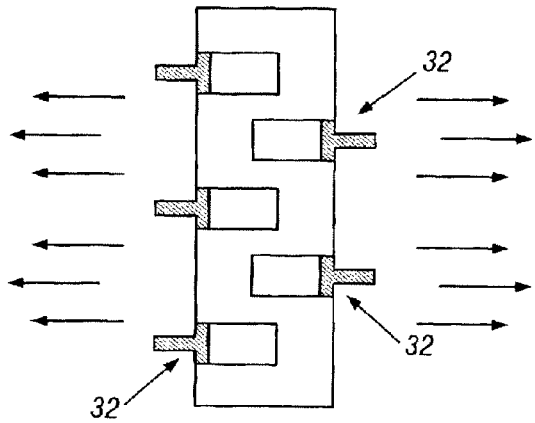
Figure 8C:
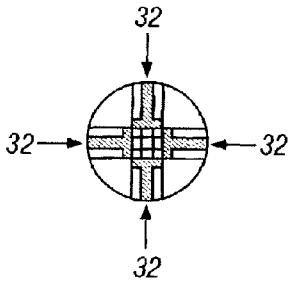
Figure 8D:
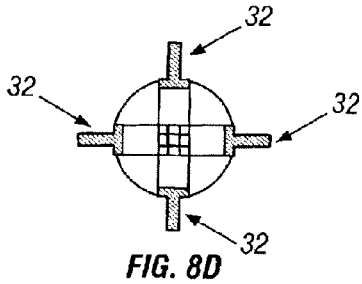

A piston type apparatus is shown in FIGS. 8A-8D and comprises a series of pistons 32 facing radially outwardly and used as a mechanism to expand the bistable expandable tubulars and connectors. When energized, the pistons 32 apply a radially directed force to deploy the bistable expandable tubular assembly as per the inflatable packer element. FIGS. 8A and 8C illustrate the pistons retracted while FIGS. 8B and 8D show the pistons extended. The piston type apparatus can be actuated hydraulically, mechanically or electrically.

Figure 9A:
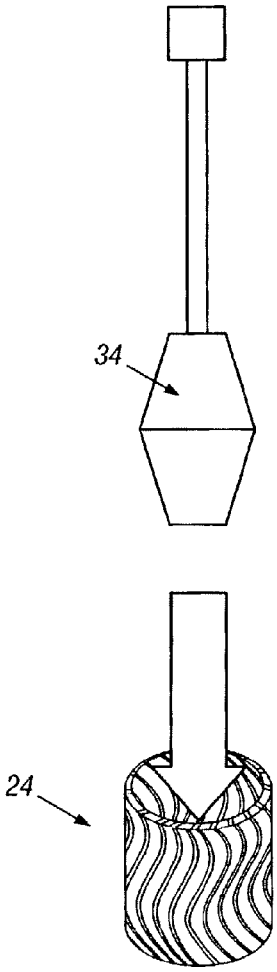
FIGS. 9A and 9B illustrate a plug type of deployment device.
Figure 9B:
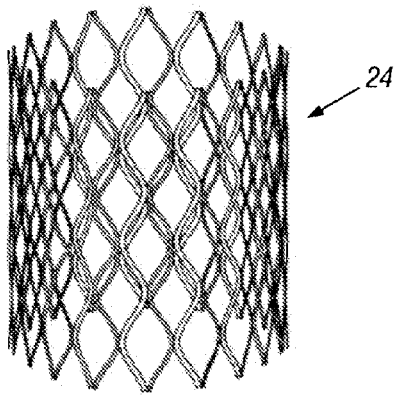

A plug type actuator is illustrated in FIGS. 9A and 9B and comprises a plug 34 that is pushed or pulled through the bistable expandable tubulars 24 or connectors as shown in FIG. 9A. The plug is sized to expand the bistable cells past their critical point where they will snap to a final expanded diameter as shown in FIG. 9B.

Figure 10A:
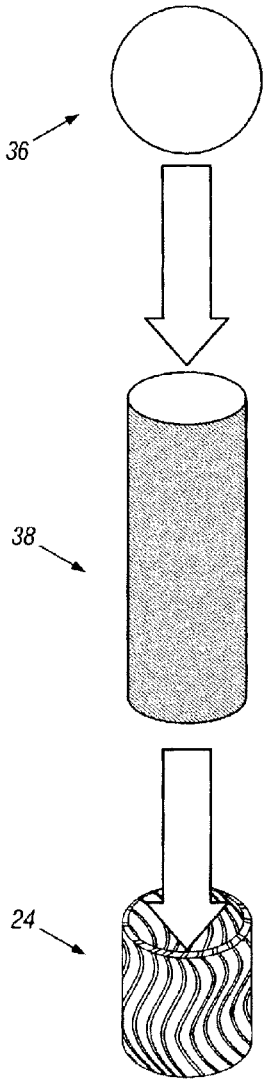
FIGS. 10A and 10B illustrate a ball type of deployment device.
Figure 10B:
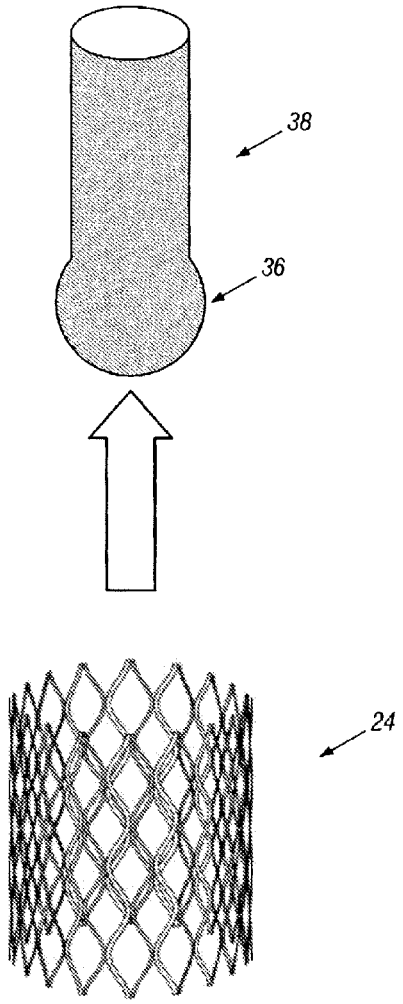

A ball type actuator is shown in FIGS. 10A and 10B and operates when an oversized ball 36 is pumped through the middle of the bistable expandable tubulars 24 and connectors. To prevent fluid losses through the cell slots, an expandable elastomer based liner 38 is run inside the bistable expandable tubular system. The liner 38 acts as a seal and allows the ball 36 to be hydraulically pumped through the bistable tubular 24 and connectors. The effect of pumping the ball 36 through the bistable expandable tubulars 24 and connectors is to expand the cell geometry beyond the critical bistable point, allowing full expansion to take place as shown in FIG. 10B. Once the bistable expandable tubulars and connectors are expanded, the elastomer sleeve 38 and ball 36 are withdrawn.

Figure 12:
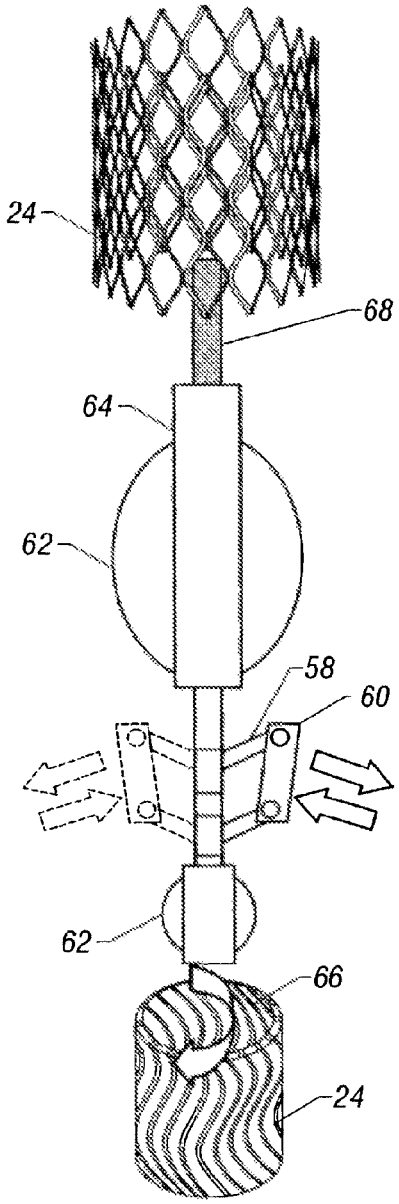
FIG. 12 illustrates a motor driven radial roller deployment device.

Radial roller type actuators also can be used to expand the bistable tubular sections. FIG. 12 illustrates a motor driven expandable radial roller tool. The tool comprises one or more sets of arms 58 that are expanded to a set diameter by means of a mechanism and pivot. On the end of each set of arms is a roller 60. Centralizers 62 can be attached to the tool to locate it correctly inside the wellbore and the bistable tubular 24. A motor 64 provides the force to rotate the whole assembly, thus turning the roller(s) circumferentially inside the wellbore. The axis of the roller(s) is such as to allow the roller(s) to rotate freely when brought into contact with the inner surface of the tubular. Each roller can be conically-shaped in section to increase the contact area of roller surface to the inner wall of the tubular. The rollers are initially retracted and the tool is run inside the collapsed bistable tubular. The tool is then rotated by the motor 64, and rollers 60 are moved outwardly to contact the inner surface of the bistable tubular. Once in contact with the tubular, the rollers are pivoted outwardly a greater distance to apply an outwardly radial force to the bistable tubular. The outward movement of the rollers can be accomplished via centrifugal force or an appropriate actuator mechanism coupled between the motor 64 and the rollers 60.

The final pivot position is adjusted to a point where the bistable tubular can be expanded to the final diameter. The tool is then longitudinally moved through the collapsed bistable tubular, while the motor continues to rotate the pivot arms and rollers. The rollers follow a shallow helical path 66 inside the bistable tubular, expanding the bistable cells in their path. Once the bistable tubular is deployed, the tool rotation is stopped and the roller retracted. The tool rotation is stopped and the roller tubular by a conveyance device 68 that also can be used to insert the tool.

Figure 13:
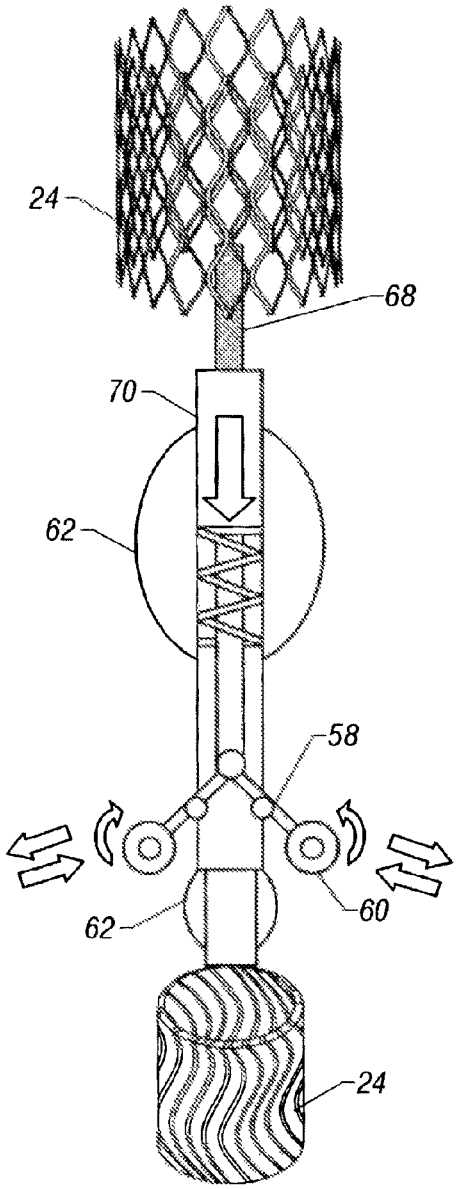
FIG. 13 illustrates a hydraulically driven radial roller deployment device.

FIG. 13 illustrates a hydraulically driven radial roller deployment device. The tool comprises one or more rollers 60 that are brought into contact with the inner surface of the bistable tubular by means of a hydraulic piston 70. The outward radial force applied by the rollers can be increased to a point where the bistable tubular expands to its final diameter. Centralizers 62 can be attached to the tool to locate it correctly inside the wellbore and bistable tubular 24. The rollers 60 are initially retracted and the tool is run into the collapsed bistable tubular 24. The rollers 60 are then deployed and push against the inside wall of the bistable tubular 24 to expand a portion of the tubular to its final diameter. The entire tool is then pushed or pulled longitudinally through the bistable tubular 24 expanding the entire length of bistable cells 23. Once the bistable tubular 24 is deployed in its expanded state, the rollers 60 are retracted and the tool is withdrawn from the wellbore by the conveyance device 68 used to insert it. By altering the axis of the rollers 60, the tool can be rotated via a motor as it travels longitudinally through the bistable tubular 24.

Power to operate the deployment device can be drawn from one or a combination of sources such as: electrical power supplied either from the surface or stored in a battery arrangement along with the deployment device, hydraulic power provided by surface or downhole pumps, turbines or a fluid accumulator, and mechanical power supplied through an appropriate linkage actuated by movement applied at the surface or stored downhole such as in a spring mechanism.

The bistable expandable tubular system is designed so the internal diameter of the deployed tubular is expanded to maintain a maximum cross-sectional area along the expandable tubular. This feature enables mono-bore wells to be constructed and facilitates elimination of problems associated with traditional wellbore casing systems where the casing outside diameter must be stepped down many times, restricting access, in long wellbores.

The bistable expandable tubular system can be applied in numerous applications such as an expandable open hole liner (see FIG. 14) where the bistable expandable tubular 24 is used to support an open hole formation by exerting an external radial force on the wellbore surface. As bistable tubular 24 is radially expanded in the direction of arrows 71, the tubular moves into contact with the surface forming wellbore 29. These radial forces help stabilize the formations and allow the drilling of wells with fewer conventional casing strings. The open hole liner also can comprise a material, e.g. a wrapping 72, that reduces the rate of fluid loss from the wellbore into the formations. The wrapping 72 can be made from a variety of materials including expandable metallic and/or elastomeric materials. By reducing fluid loss into the formations, the expense of drilling fluids can be reduced and the risk of losing circulation and/or borehole collapse can be minimized.

Liners also can be used within wellbore tubulars for purposes such as corrosion protection. One example of a corrosive environment is the environment that results when carbon dioxide is used to enhance oil recovery from a producing formation. Carbon dioxide ($CO_2$) readily reacts with any water ($H_2O$) that is present to form carbonic acid ($H_2CO_3$). Other acids can also be generated, especially if sulfur compounds are present. Tubulars used to inject the carbon dioxide as well as those used in producing wells are subject to greatly elevated corrosion rates. The present invention can be used for placing protective liners, a bistable tubular 24, within an existing tubular (e.g. tubular 73 illustrated with dashed lines in FIG. 14) to minimize the corrosive effects and to extend the useful life of the wellbore tubulars.

Figure 14:
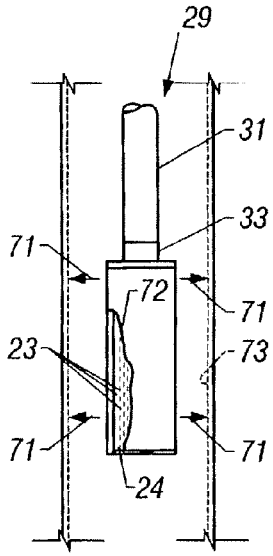
FIG. 14 illustrates a bistable expandable tubular having a wrapping.

Another application involves use of the bistable tubular 24 illustrated in FIG. 14 as an expandable perforated liner. The open bistable cells in the bistable expandable tubular allow unrestricted flow from the formation while providing a structure to stabilize the borehole.

Figure 14A:
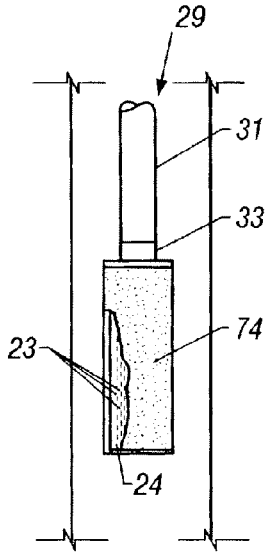
FIG. 14A is a view similar to FIG. 14 in which the wrapping comprises a screen.

Still another application of the bistable tubular 24 is as an expandable sand screen where the bistable cells are sized to act as a sand control screen or an expandable screen element 74 can be affixed to the bistable expandable tubular as illustrated in FIG. 14A in its collapsed state. The expandable screen element 74 can be formed as a wrapping around bistable tubular 24. It has been found that the imposition of hoop stress forces onto the wall of a borehole will in itself help stabilize the formation and reduce or eliminate the influx of sand from the producing zones, even if no additional screen element is used.

Figure 14B:
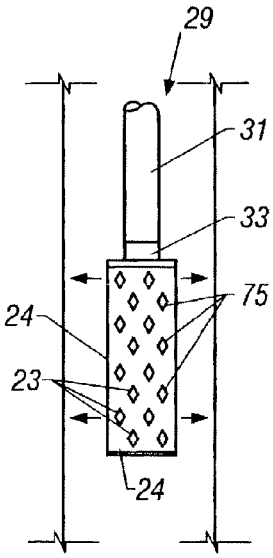
FIG. 14B is a view similar to FIG. 14 showing another alternate embodiment.

Another application of the bistable tubular 24 is as a reinforced expandable liner where the bistable expandable tubular cell structure is reinforced with a cement or resin 75, as illustrated in FIG. 14B. The cement or resin 75 provides increased structural support or hydraulic isolation from the formation.

Figure 14C:
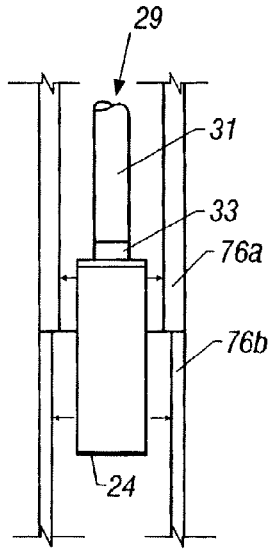
FIG. 14C is a view similar to FIG. 14 showing another alternate embodiment.

The bistable expandable tubular 24 also can be used as an expandable connection system to join traditional lengths of casing 76a or 76b of different diameters as illustrated in FIG. 14C. The tubular 24 also can be used as a structural repair joint to provide increased strength for existing sections of casing.

Figure 14D:
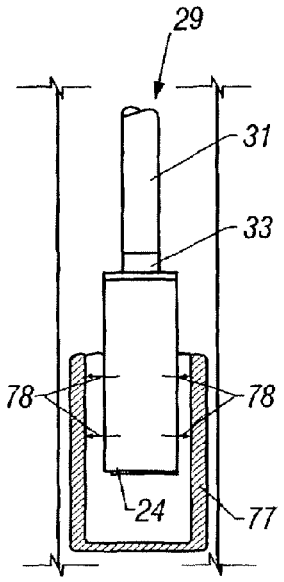
FIG. 14D is a view similar to FIG. 14 showing another alternate embodiment.
Figure 14E:
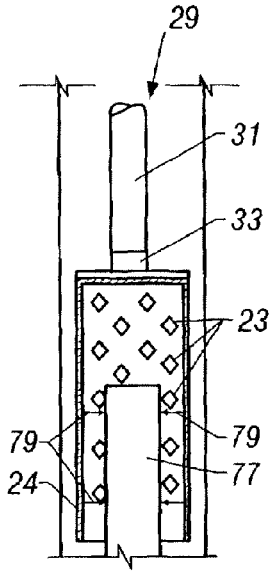
FIG. 14E is a view similar to FIG. 14 showing another alternate embodiment.

Another application includes using the bistable expandable tubular 24 as an anchor within the wellbore from which other tools or casings can be attached, or as a "fishing" tool in which the bistable characteristics are utilized to retrieve items lost or stuck in a wellbore. The bistable expandable tubular 24 in its collapsed configuration is inserted into a lost item 77 and then expanded as indicated by arrows 78 in FIG. 14D. In the expanded configuration the bistable tubular exerts radial forces that assist in retrieving the lost item. The bistable tubular also can be run into the well in its expanded configuration, placed over and collapsed in the direction of arrows 79 around lost item 77 in an attempt to attach and retrieve it as illustrated in FIG. 14E. Once lost item 77 is gripped by bistable tubular 24, it can be retrieved through wellbore 29.

The above described bistable expandable tubulars can be made in a variety of manners such as: cutting appropriately shaped paths through the wall of a tubular pipe thereby creating an expandable bistable device in its collapsed state; cutting patterns into a tubular pipe thereby creating an expandable bistable device in its expanded state and then compressing the device into its collapsed state; cutting appropriate paths through a sheet of material, rolling the material into a tubular shape and joining the ends to form an expandable bistable device in its collapsed state; or cutting patterns into a sheet of material, rolling the material into a tubular shape, joining the adjoining ends to form an expandable bistable device in its expanded state and then compressing the device into its collapsed state.

The materials of construction for the bistable expandable tubulars can include those typically used within the oil and gas industry such as carbon steel. They can also be made of specialty alloys (such as a monel, inconel, hastelloy or tungsten-based alloys) if the application requires.

The configurations shown for the bistable tubular 24 are illustrative of the operation of a basic bistable cell. Other configurations may be suitable, but the concept presented is also valid for these other geometries.

Figure 15:
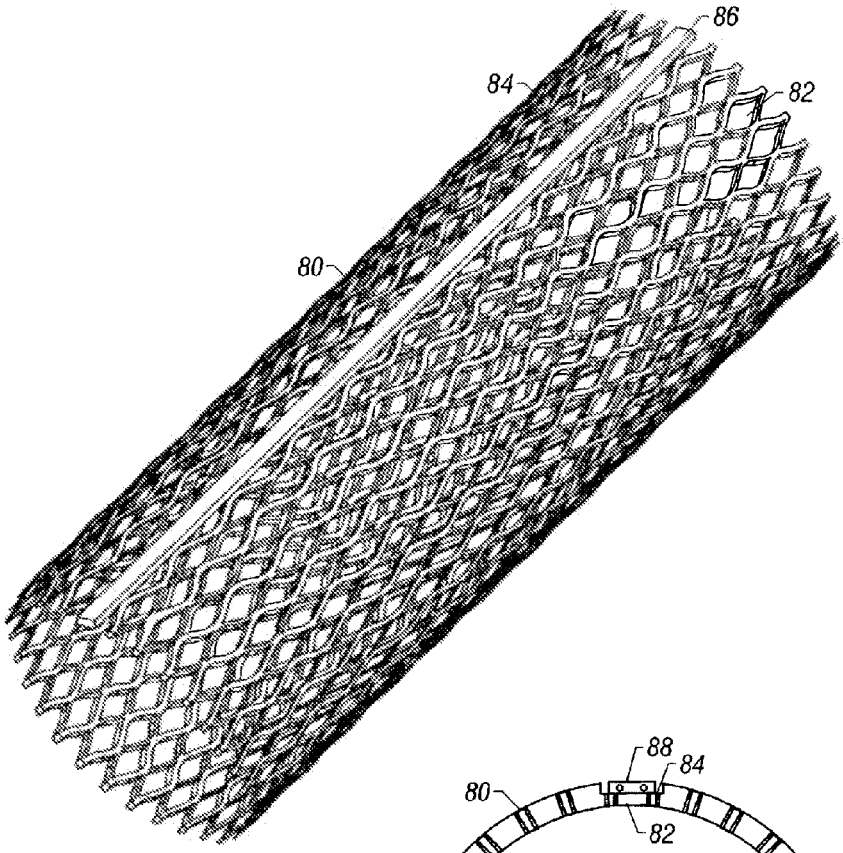
FIG. 15 is a perspective view of an alternative embodiment of the present invention.

FIG. 15 illustrates an expandable tubing 80 formed of bi-stable cells 82. The tubing 80 defines a thinned portion 84 (best seen in FIG. 15) which may be in the form of a slot, as shown, a flattening; or other thinning of a portion of the tubing 80. The thinned portion 84 extends generally longitudinally and may be linear, helical, or follow some other circuitous path. In one embodiment, the thinned portion extends from one end of the tubing to the other to provide a communication line path 84 for the tubing 80. In such an embodiment, a communication line 86 may pass through the communication line path 84 along the tubing 80. In this way, the communication line 86 stays within the general outside diameter of the tubing 80 or extends only slightly outside this diameter. Although the tubing is shown with one thinned portion 84, it may include a plurality that are spaced about the circumference of the tubing 80. The thinned portion 84 may be used to house a conduit (not shown) through which communication lines 86 pass or which is used for the transport of fluids or other materials, such as mixtures of fluids and solids.

As used herein, the term "communication line" refers to any type of communication line such as electric, hydraulic, fiber optic, combinations of these, and the like.

Figure 15A:
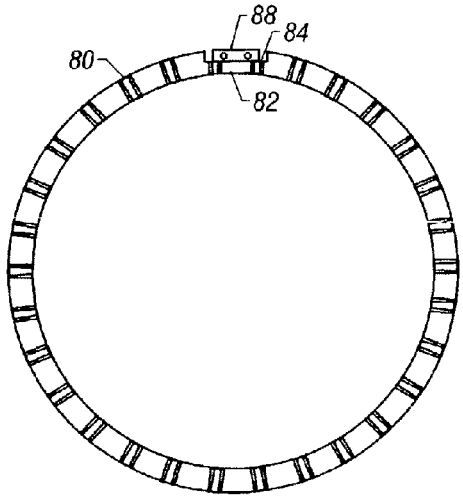
FIG. 15A is a cross-sectional view of an alternative embodiment of the present invention.

FIG. 15A illustrates an exemplary thinned portion 84 designed to receive a device 88. As with the cable placement, device 88 is at least partially housed in the thinned portion of the tubing 80 so that the extent to which it extends beyond the outer diameter of the tubing 80 is lessened. Examples of certain alternative embodiments of devices 88 are electrical devices, measuring devices, meters, gauges, sensors. More specific examples comprise valves, sampling devices, a device used in intelligent or smart well completion, temperature sensors, pressure sensors, flow-control devices, flow rate measurement devices, oil/water/gas ratio measurement devices, scale detectors, equipment sensors (e.g., vibration sensors), sand detection sensors, water detection sensors, data recorders, viscosity sensors, density sensors, bubble point sensors, composition sensors, resistivity array devices and sensors, acoustic devices and sensors, other telemetry devices, near infrared sensors, gamma ray detectors, $H_2S$ detectors, $CO_2$ detectors, downhole memory units, downhole controllers. Examples of measurements that the devices might make are flow rate, pressure, temperature, differential pressure, density, relative amounts of liquid, gas, and solids, water cut, oil-water ratio, and other measurements.

As shown in the figure, the device 88 may be exposed to fluid inside and outside of tubing 80 via openings formed by the cells 82. Thus, the thinned portion 84 may bridge openings as well as linkages 21, 22 of the cells 82. Also note that the communication line 86 and associated communication line path 84 may extend a portion of the length of the tubing 80 in certain alternative designs. For example, if a device 88 is placed intermediate the ends of the tubing 80, the communication line passageway 84 may only need to extend from an end of the tubing to the position of the device 80.

Figure 16:
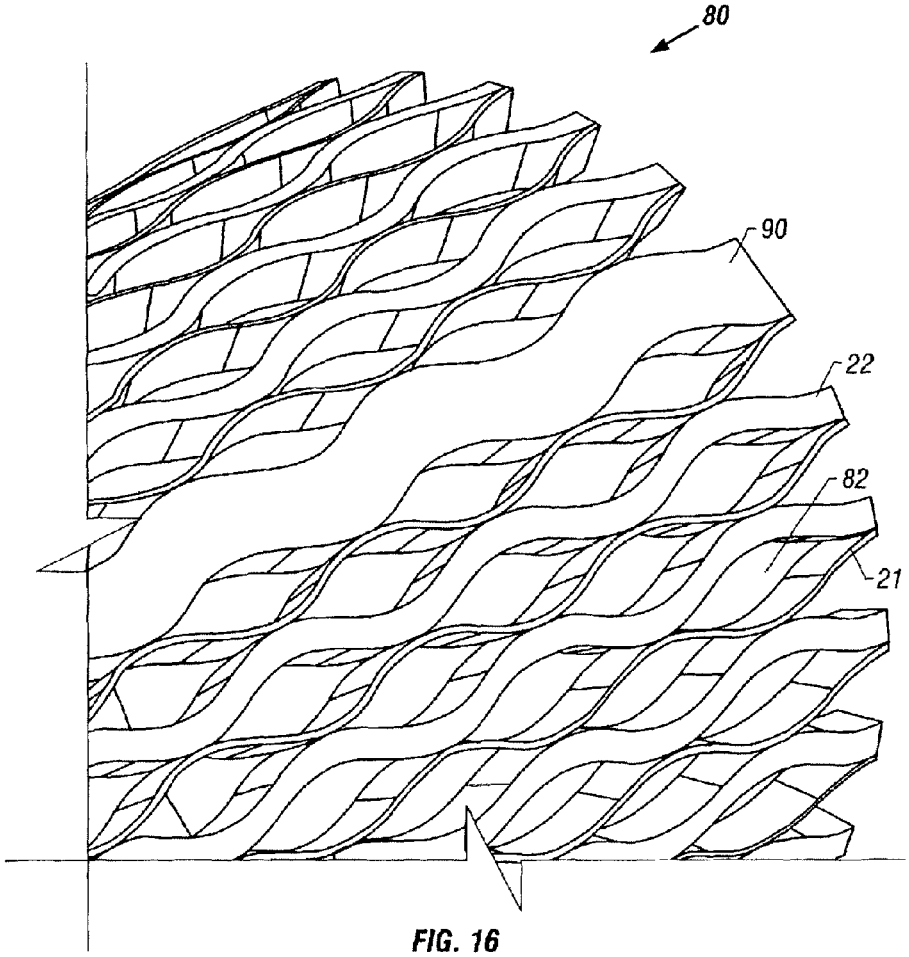
FIG. 16 is a partial perspective view of an alternative embodiment of the present invention.

FIG. 16 illustrates an expandable tubing 80 formed of bi-stable cells 82 having thin struts 21 and thick struts 22. At least one of the thick struts (labeled as 90) is relatively wider than other struts of the tubing 80. The wider strut 90 may be used for various purposes such as routing of communication lines, including cables, or devices, such as sensor arrays.

Figure 17A:
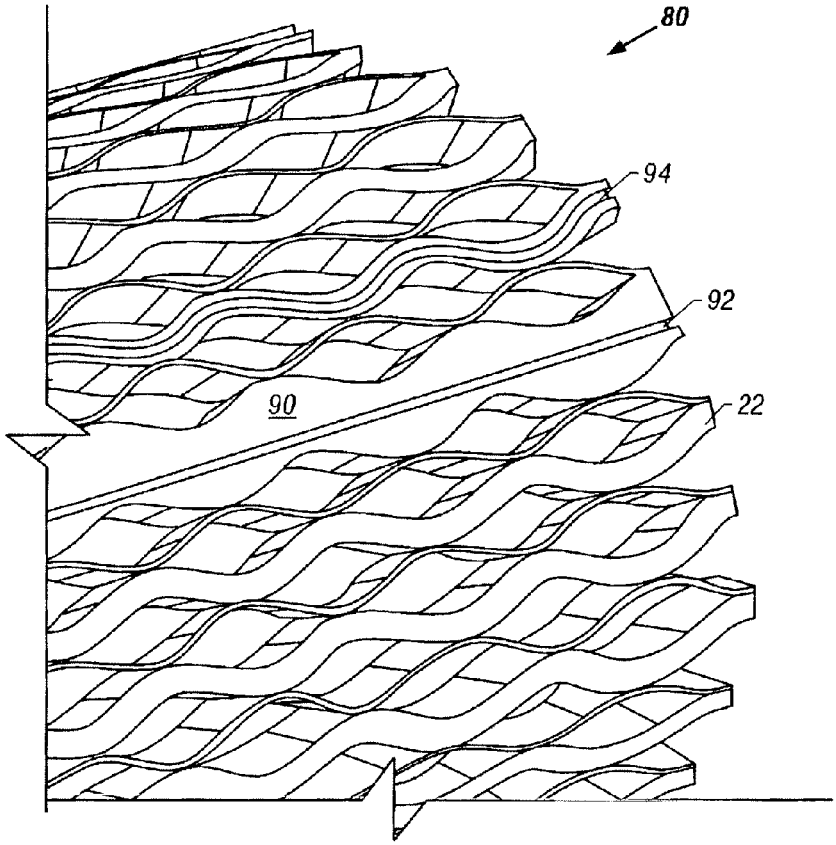
FIGS. 17A-B are a partial perspective view and a partial cross-sectional end view respectively of an alternative embodiment of the present invention.
Figure 17B:
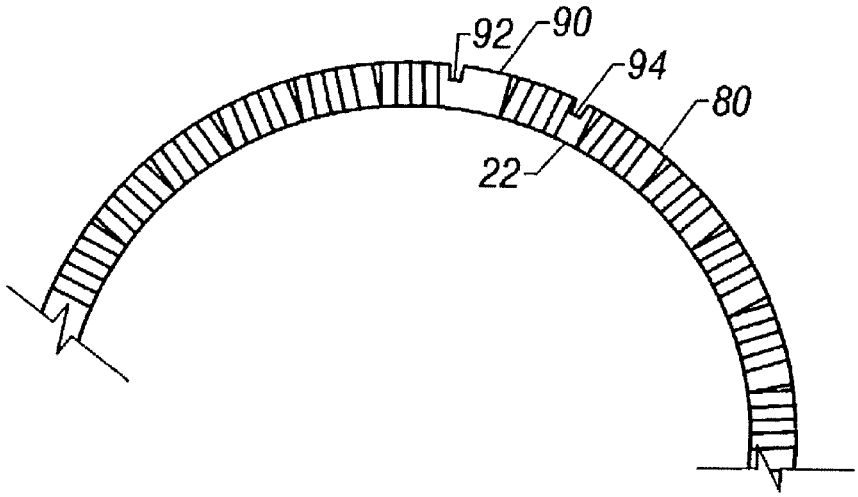

FIGS. 17A and 17B illustrate tubing 80 having a strut 90 that is relatively wider than the other thick struts 22. A passageway 92 formed in the strut 90 facilitates placement of a communication line in the well and through the tubing 80 and may be used for other purposes. FIG. 17B is a cross sectional view showing the passageway 92. Passageway 92 is an alternative embodiment of a communication line path 84. A passageway 94 may be configured to generally follow the curvature of a strut, e.g. one of the thick struts 22, as further illustrated in FIGS. 17A and 17B.

Figure 18:
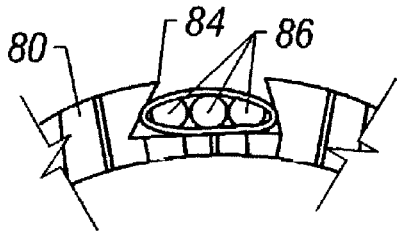
FIG. 18 is a partial cross-sectional end view of an alternative embodiment of the present invention.

FIG. 18 illustrates a thinned portion 84 having a dovetail design with a relatively narrower opening. The communication line 86 is formed so that it fits through the relatively narrow opening into the wider, lower portion, e.g. by inserting one side edge and then the other. Communication line 86 is held in place due to the dovetail design as is apparent from the figures. The width of the communication line 86 is greater than the width of the opening. Note that the communication line 86 may comprise a bundle of lines which may be of the same or different forms (e.g., a hydraulic, an electric, and a fiber optic line bundled together). Also, connectors for connecting adjacent tubings may incorporate a connection for the communication lines.

Note that the communication line passageway 84 may be used in conjunction with other types of expandable tubings, such as those of the expandable slotted liner type disclosed in U.S. Pat. No. 5,366,012, issued Nov. 22, 1994 to Lohbeck, the folded tubing types of U.S. Pat. No. 3,489,220, issued Jan. 13, 1970 to Kinley, U.S. Pat. No. 5,337,823, issued Aug. 16, 1994 to Nobileau, U.S. Pat. No. 3,203,451, issued Aug. 31, 1965 to Vincent.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

[1. An expandable system, comprising:

a tubular member configured for use in a wellbore, the tubular member having longitudinal structures extending the length of the tubular member and openings oriented between the longitudinal structures such that expansion of the tubular member expands the plurality of openings without deforming the longitudinal structures;

wherein the tubular member comprises a plurality of pivotal links connecting adjacent longitudinal structures.]

2. [The] *An* expandable system, *comprising:*

[as recited in claim 1, wherein the tubular member comprises] *a tubular member comprising* a sandscreen *and configured for use in a wellbore, the tubular member having longitudinal structures extending the length of the tubular member and openings oriented between the longitudinal structures such that expansion of the tubular member expands the plurality of openings without deforming the longitudinal structures;*

*wherein the tubular member comprises a plurality of pivotal links connecting adjacent longitudinal structures.*

[3. The expandable system as recited in claim 1, wherein the tubular member comprises a liner.]

4. [The] *An* expandable system, *comprising:*

*a tubular member configured for use in a wellbore, the tubular member having longitudinal structures extending the length of the tubular member and openings oriented between the longitudinal structures such that expansion of the tubular member expands the plurality of openings without deforming the longitudinal structures;*

*wherein the tubular member comprises a plurality of pivotal links connecting adjacent longitudinal structures; and*

[as recited in claim 1,] wherein the plurality of pivotal links are arranged to undergo plastic deformation during expansion of the tubular member.

5. The expandable system as recited in claim 2, further comprising a communication line routed along the tubular member.

6. The expandable system as recited in claim 5, wherein the tubular member comprises a passageway in which the communication line is received.

7. The expandable system as recited in claim 5, further comprising a device coupled to the communication line.

[8. The expandable system as recited in claim 1, further comprising a deformable material surrounding an outer surface of the tubular member.]

[9. The expandable system as recited in claim 8, wherein the deformable material comprises an elastomer.]

10. [The] *An* expandable system, *comprising:*

[as recited in claim 1, wherein the tubular member comprises] *a tubular member configured for use in a wellbore, the tubular member comprising* a plurality of different diameters in [its] *an* expanded state, *the tubular member having longitudinal structures extending the length of the tubular member and openings oriented between the longitudinal structures such that expansion of the tubular member expands the plurality of openings without deforming the longitudinal structures;*

*wherein the tubular member comprises a plurality of pivotal links connecting adjacent longitudinal structures.*

[11. A method of utilizing a tubular within a wellbore, comprising:

radially expanding the tubular within a wellbore; and maintaining substantially constant the axial length of the tubular;

wherein maintaining comprises linking a plurality of longitudinal bars with flexible links.]

12. [The] *A* method *of utilizing a tubular within a wellbore, comprising:*

[as recited in claim 11, wherein radially expanding further comprises] *radially expanding the tubular within a wellbore and* creating expanded openings in a wall of the tubular*; and*

*maintaining substantially constant the axial length of the tubular, wherein maintaining comprises linking a plurality of longitudinal bars with flexible links.*

[13. The method as recited in claim 11, wherein maintaining comprises arranging expandable cells such that radial expansion can occur without axial shortening of the tubular.]

14. [The] *A* method *of utilizing a tubular within a wellbore, comprising:*

[as recited in claim 11, wherein radially expanding] *radially expanding the tubular within a wellbore, wherein the tubular* comprises [expanding] a sandscreen*; and*

*maintaining substantially constant the axial length of the tubular, wherein maintaining comprises linking a plurality of longitudinal bars with flexible links.*

15. An expandable device for use in a wellbore, comprising:

a wellbore conduit having a plurality of expandable cells, each cell having a thick strut and a compliant link, wherein radial expansion of the wellbore conduit results when the compliant link is transitioned from a contracted position to an expanded position;

wherein the plurality of expandable cells comprise a passageway in which a communication line is deployed.

16. The expandable device as recited in claim 15, wherein the compliant link is arcuate.

17. The expandable device as recited in claim 15, wherein the axial length of the wellbore conduit remains substantially constant during radial expansion of the wellbore conduit.

18. The expandable device as recited in claim 15, wherein the thick strut has a thickness at least two times greater than the thickness of the compliant link.

19. The expandable device as recited in claim 15, wherein the wellbore conduit comprises a sandscreen.

[20. A method of forming an expandable conduit, comprising:

forming a conduit wall with a plurality of expandable cells; and structuring each expandable cell with at least one undeformed longitudinal section and at least one thin strut that can be transitioned to move the conduit wall between a contracted state and an expanded state;

wherein the plurality of expandable cells comprise a passageway in which a communication line is deployed.]

21. [The method as recited in claim 20, further comprising] *A method of forming an expandable conduit, comprising:*

*forming a conduit wall with a plurality of expandable cells, the conduit wall comprising a longitudinal thinned portion that provides a slot configured to receive a communication line;*

*structuring each expandable cell with at least one undeformed longitudinal section and at least one thin strut that can be transitioned to move the conduit wall between a contracted state and an expanded state; and* determining a force deflection characteristic of the conduit wall by selecting a thickness ratio of the at least one undeformed longitudinal section to the at least one thin strut*; wherein the plurality of expandable cells comprise a passageway in which a communication line is deployed.*

22. The method as recited in claim 21, wherein selecting comprises selecting a thickness ratio of at least 2:1.

23. The method as recited in claim 21, wherein selecting comprises selecting a thickness ratio of at least 3:1.

24. The method as recited in claim 21, wherein selecting comprises selecting a thickness ratio of at least 6:1.

25. [The method as recited in claim 20, further comprising] *A method of forming an expandable conduit, comprising:*

*forming a conduit wall with a plurality of expandable cells, the conduit wall comprising a longitudinal thinned portion that provides a slot configured to receive a communication line;*

*structuring each expandable cell with at least one undeformed longitudinal section and at least one thin strut that can be transitioned to move the conduit wall between a contracted state and an expanded state; and* determining a force deflection characteristic by selecting a cell shape*; wherein the plurality of expandable cells comprise a passageway in which a communication line is deployed.*

26. The method as recited in claim 25, wherein selecting comprises selecting a curvature of the thin strut while the conduit wall is in the contracted state.

*27. The expandable system as recited in claim 7, wherein the device is at least one selected from the group consisting of an electrical device, a measuring device, a meter, a gauge, a sensor, and any combination thereof.*

*28. The expandable system as recited in claim 7, wherein the device is at least one selected from the group consisting of a valve, a sampling device, a device used in intelligent or smart well completion, a temperature sensor, a pressure sensor, a flow-control device, a flow rate measurement device, an oil/water/gas ratio measurement device, a scale detector, an equipment sensor, a vibration sensor, a sand detection sensor, a water detection sensor, a data recorder, a viscosity sensor, a density sensor, a bubble point sensor, a composition sensor, a resistivity array device and sensor, an acoustic device and sensor, a telemetry device, a near infrared sensor, a gamma ray detector, an hydrogen sulfide detector, a carbon dioxide detector, a downhole memory unit, a downhole controller, and any combination thereof.*

*29. The expandable system as recited in claim 2, wherein the sandscreen further comprises an expandable screen element.*

*30. The expandable system as recited in claim 4, further comprising a communication line routed along the tubular member.*

*31. The expandable system as recited in claim 30, wherein the tubular member comprises a passageway in which the communication line is received.*

*32. The expandable system as recited in claim 30, further comprising a device coupled to the communication line.*

*33. The expandable system as recited in claim 10, further comprising a communication line routed along the tubular member.*

*34. The expandable system as recited in claim 33, wherein the tubular member comprises a passageway in which the communication line is received.*

*35. The expandable system as recited in claim 33, further comprising a device coupled to the communication line.*

* * * * *